United States Patent
Bodi

(10) Patent No.: US 10,803,724 B2
(45) Date of Patent: Oct. 13, 2020

(54) SYSTEM, DEVICE, AND METHOD OF DETECTING DANGEROUS SITUATIONS

(71) Applicant: Robert Francis Bodi, Westlake, OH (US)

(72) Inventor: Robert Francis Bodi, Westlake, OH (US)

(73) Assignee: Innovation By Imagination LLC, Westlake, OH (US)

( * ) Notice: Subject to any disclaimer, the term of this patent is extended or adjusted under 35 U.S.C. 154(b) by 0 days.

(21) Appl. No.: 15/786,114

(22) Filed: Oct. 17, 2017

(65) Prior Publication Data

US 2018/0040223 A1 Feb. 8, 2018

Related U.S. Application Data

(63) Continuation of application No. 13/450,131, filed on Apr. 18, 2012.

(60) Provisional application No. 61/476,942, filed on Apr. 19, 2011.

(51) Int. Cl.
| | |
|---|---|
| *G08B 21/08* | (2006.01) |
| *G08B 5/00* | (2006.01) |
| *G08B 21/18* | (2006.01) |
| *G08B 21/04* | (2006.01) |

(52) U.S. Cl.
CPC ........... *G08B 21/088* (2013.01); *G08B 5/002* (2013.01); *G08B 21/0415* (2013.01); *G08B 21/0476* (2013.01); *G08B 21/0492* (2013.01); *G08B 21/08* (2013.01); *G08B 21/086* (2013.01); *G08B 21/18* (2013.01)

(58) Field of Classification Search
CPC .. G08B 21/088; G08B 21/0415; G08B 21/08; G08B 21/0492; G08B 21/0476; G08B 21/086; G08B 21/18; G08B 5/002
See application file for complete search history.

(56) References Cited

U.S. PATENT DOCUMENTS

| | | | | |
|---|---|---|---|---|
| 3,947,833 A | * | 3/1976 | Eckstein, Jr. | G06K 9/3241 340/555 |
| 4,518,437 A | * | 5/1985 | Sommer | E04H 4/1654 134/18 |
| 5,023,593 A | * | 6/1991 | Brox | G08B 21/082 340/522 |
| 5,043,705 A | | 8/1991 | Rooz et al. | |
| 5,355,140 A | * | 10/1994 | Slavin | G01S 5/0009 342/357.31 |
| 5,408,222 A | | 4/1995 | Yaffe et al. | |
| 5,563,580 A | | 10/1996 | Stephens | |
| 5,806,514 A | * | 9/1998 | Mock | B63C 11/32 128/201.27 |
| 5,923,263 A | | 7/1999 | Rodriguez | |
| 6,035,341 A | * | 3/2000 | Nunally | G08B 13/19645 348/E5.099 |
| 6,133,838 A | | 10/2000 | Meniere | |
| 6,154,140 A | | 11/2000 | Thorpe et al. | |

(Continued)

*Primary Examiner* — Joseph Suh
(74) *Attorney, Agent, or Firm* — Bodi Law LLC

(57) ABSTRACT

A safety device, and more particularly a device or system of devices for detecting dangerous situations such as the act of drowning of an individual in a body of water or a child that suddenly goes missing or otherwise inactive in a defined area, and issuing a warning to others that the potential dangerous situation is taking place so that the individual can be rescued.

20 Claims, 11 Drawing Sheets

(56) References Cited

U.S. PATENT DOCUMENTS

| | | | |
|---|---|---|---|
| 6,327,220 B1* | 12/2001 | Miller, Jr. | H04B 11/00 367/134 |
| 6,486,777 B2 | 11/2002 | Clark | |
| 7,839,291 B1 | 11/2010 | Richards | |
| 8,169,481 B2 | 5/2012 | Ozdemir et al. | |
| 8,237,574 B2* | 8/2012 | Anderson | G08B 21/086 340/541 |
| 8,354,924 B1 | 1/2013 | Goodwin | A63B 69/12 340/539.11 |
| 2002/0007126 A1* | 1/2002 | Nissila | A61B 5/0006 600/509 |
| 2003/0222782 A1* | 12/2003 | Gaudreau | G08B 21/082 340/573.6 |
| 2004/0077934 A1* | 4/2004 | Massad | A61B 5/0205 600/300 |
| 2004/0095248 A1 | 5/2004 | Mandel | |
| 2005/0091213 A1* | 4/2005 | Schutz | G06F 21/31 |
| 2005/0151884 A1* | 7/2005 | Oh | H04N 5/2628 348/576 |
| 2006/0038895 A1* | 2/2006 | Suzuki | B60R 1/00 348/222.1 |
| 2006/0190419 A1* | 8/2006 | Bunn | G06N 20/00 706/2 |
| 2006/0201508 A1* | 9/2006 | Forsyth | A62B 7/08 128/204.26 |
| 2007/0060452 A1* | 3/2007 | Chang | A63B 69/12 482/55 |
| 2007/0123121 A1 | 5/2007 | Quintero | |
| 2007/0247307 A1* | 10/2007 | Riep | G08B 21/0202 340/539.13 |
| 2007/0268369 A1* | 11/2007 | Amano | H04N 7/18 348/207.99 |
| 2008/0048870 A1* | 2/2008 | Laitta | G08B 13/19652 340/573.6 |
| 2008/0055412 A1* | 3/2008 | Tanaka | G08G 1/04 348/159 |
| 2008/0192114 A1* | 8/2008 | Pearson | G03B 17/08 348/81 |
| 2008/0298571 A1* | 12/2008 | Kurtz | H04N 7/142 379/156 |
| 2009/0103083 A1* | 4/2009 | Kremeyer | G01N 21/1702 356/317 |
| 2009/0201772 A1* | 8/2009 | Billeaudeaux | G04G 9/02 368/82 |
| 2009/0280705 A1 | 11/2009 | Puls | |
| 2009/0295566 A1 | 12/2009 | Weintraub | |
| 2009/0303055 A1* | 12/2009 | Anderson | G08B 21/086 340/573.6 |
| 2009/0326417 A1* | 12/2009 | Ales, III | A61F 13/42 600/584 |
| 2010/0002069 A1* | 1/2010 | Eleftheriadis | H04N 7/152 348/14.08 |
| 2010/0030482 A1* | 2/2010 | Li | A61B 5/1112 702/19 |
| 2010/0252037 A1 | 10/2010 | Wondka | |
| 2010/0267361 A1 | 10/2010 | Sullivan | |
| 2011/0112442 A1 | 5/2011 | Meger | |
| 2011/0153042 A1* | 6/2011 | Burton | A63B 24/0062 700/91 |
| 2011/0241887 A1* | 10/2011 | McKinney | G08B 21/088 340/573.6 |
| 2012/0136231 A1* | 5/2012 | Markel | A61B 5/0015 600/388 |
| 2014/0292543 A1* | 10/2014 | Lahyani | A61B 5/1123 340/984 |

\* cited by examiner

SYSTEM, DEVICE, AND METHOD OF DETECTING DANGEROUS SITUATIONS

CROSS-REFERENCES TO RELATED APPLICATIONS

This application is a continuation of application Ser. No. 13/450,131, filed on Apr. 18, 2012, which claims the benefit of provisional application Ser. No. 61/476,942 which was filed on Apr. 19, 2011, both of which are incorporated herein by reference.

FIELD OF THE INVENTION

This application relates generally to a safety device, and more particularly to a device or system of devices for detecting dangerous situations such as the act of drowning of an individual in a body of water or a child that suddenly goes missing or otherwise inactive in a defined area, and issuing a warning to others that a potential dangerous situation is taking place so that the individual can be rescued.

BACKGROUND OF THE INVENTION

Drowning is one of the most common causes of accidental death in young children, typically falling second only to automobile accidents. Drowning is also a major risk of death in older children and adults as well. Even persons trained in swimming can fall victim to drowning in some circumstances.

Despite this high risk, there are few, if any, devices that have been provided to detect the process of drowning in an individual and provide a warning. Such a device, or system of devices, would prove useful in preventing drowning deaths, particularly those in young children being supervised.

Often, children swim under the supervision of parents or other adults, but it is not unusual for such parents or other adults to be distracted by other things, such as conversation with others. Furthermore, such monitoring adults may be unaware of the actual signs that a child is drowning, which typically do not appear as portrayed in movies, for example. Thus, such a device or system of devices that can use technology to detect that the process of drowning has begun or is at risk of beginning could prove useful in preventing many drownings.

Furthermore, there are additional dangerous or otherwise unusual situations where a child or even an adult may be either in danger, or in a crisis, and require some intervention or other activity for correction or other response. For example, a child or adult may fall out of a tree, or be injured on playground equipment or using yard or farm equipment, or wander from a secured area, requiring intervention by a monitoring adult or rescue person. A means of monitoring for such or similar situations and informing desired parties would thus also be useful.

SUMMARY OF THE INVENTION

Provided are a plurality of embodiments of the invention related to one or more devices for detecting that an individual is drowning, and providing a notice to persons in the surrounding area or a lifeguard that a drowning is taking place.

Provided is system that analyzes video and audio information including visible video information of a swimmer, swimmer vocalizations, and/or infrared swimmer information to determine that a drowning event may be occurring, resulting in the issuance of a notification that such an event may be occurring.

Also provided is a system that analyzes sensor information obtained from one or more sensors mounted on a swimmer to determine that a drowning event may be occurring, resulting in the issuance of a notification that such an event may be occurring.

Further provided is system that analyzes video information obtained from a video and sensor information obtained from one or more sensors mounted on a swimmer to determine that a drowning event may be occurring, resulting in the issuance of a notification that such an event may be occurring.

Also provided is a system for monitoring a swimmer comprising: at least one sensor for providing swimmer status data about a status of the swimmer; a processor for analyzing the swimmer status data to determine whether the swimmer status data indicates that the swimmer is in distress; and an alarm indicator for indicating an alarm condition when the processor determines that the swimmer is in distress.

Further provided is a system for monitoring a swimmer comprising: a plurality of sensor subsystems for obtaining swimmer status data about the swimmer; a processor for receiving the swimmer status data from the sensor subsystems for analyzing the swimmer status data to determine a status of the swimmer such that the processor determines whether the swimmer is in distress; and an alarm indicator for indicating an alarm condition when the processor determines that the swimmer is in distress.

Also provided is a system for monitoring a plurality of swimmers comprising: a plurality of sensor subsystems, each one of the sensor subsystems including a corresponding wireless transmitter and at least one sensor for providing swimmer status data about one or more of the plurality of swimmers, such that in concert, the plurality of sensor subsystems monitor each one of the plurality of swimmers; a processor for receiving the swimming data from the plurality of sensor subsystems via the corresponding wireless transmitter, the processor being adapted for analyzing the swimmer status data to determine a status of each one of the plurality of swimmers such that the processor determines whether any one of the plurality of swimmers is in distress; and an alarm indicator for indicating an alarm condition when the processor determines that one of the plurality of swimmers is in distress.

Further provided is a system for monitoring a plurality of swimmers in a swimming area, the system comprising: a plurality of video cameras distributed about the swimming area, each one of the plurality of video cameras for obtaining video data about some corresponding subset of the plurality of swimmers; a processor for receiving the video data from the plurality of cameras, wherein the processor analyzes the video data to determine whether any one of the swimmers is in distress, and wherein if any of the swimmers is in distress, the processor provides data indicating an alarm condition to a device for providing an alarm indication to a user.

Also provided is a system for monitoring a plurality of swimmers in a swimming area, the system comprising: a plurality of video sensors distributed about the swimming area, each one of the plurality of video sensors for obtaining video data about some subset of the plurality of swimmers; a plurality of audio sensors distributed about a swimming area, each one of the plurality of audio sensors for obtaining audio data about some subset of the plurality of swimmers; a processor for receiving the video data from the plurality of cameras, and also for receiving the audio data from the plurality of audio sensors; and a memory for storing swimming parameters.

In any of the above systems, the processor can analyze the video data and the audio data utilizing the swimming parameters in order to determine whether any one of the swimmers is in distress, and if any of the swimmers is in distress, the processor can provide data indicating an alarm condition to a device for providing an alarm indication to a user.

Further provided is a system for monitoring a plurality of swimmers in a swimming area, the system comprising: a plurality of video cameras distributed about the swimming area, each one of the plurality of video cameras for obtaining video data about some subset of the plurality of swimmers; a plurality of audio sensors distributed about the swimming area, each one of the plurality of audio sensors for obtaining audio data about some subset of the plurality of swimmers; a processor for receiving the video data from the plurality of cameras, and also for receiving the audio data from the plurality of audio sensors; a display for displaying a status of the swimmers; and a memory for storing swimming parameters.

In any of the above systems, the processor can be adapted to analyze the video data and the audio data utilizing the swimming parameters in order to determine whether any one of the swimmers is in distress, and if any one or more of the swimmers is in distress, the processor can indicate an alarm condition on the display and presents a live image of any of the swimmers in distress on the display.

Also provided is a method of determining whether a swimmer is in distress, comprising the steps of:
  Monitoring the activity level of the swimmer;
  Determining when the activity level of the swimmer has changed;
  Determining whether the change in activity level indicates that the swimmer is in distress; and
  Providing a distress indication if it is determined that the swimmer is in distress.

Further provided is a method of determining whether a swimmer is in distress, comprising the steps of:
  Monitoring the activity level of the swimmer using one or more sensors;
  Determining when the activity level of the swimmer has changed by analyzing data from the one or more sensors;
  Determining whether the change in activity level indicates that the swimmer is in distress; and
  Providing a distress indication if it is determined that the swimmer is in distress.

Also provided is a method including any of the above methods where historical information such as false alarms and recent swimmer activity levels, swimmer age, and/or swimmer skill levels are utilized to determine whether the swimmer is in distress.

BRIEF DESCRIPTION OF THE DRAWINGS

The features and advantages of the examples of the present invention described herein will become apparent to those skilled in the art to which the present invention relates upon reading the following description, with reference to the accompanying drawings, in which.

DETAILED DESCRIPTION OF THE EXAMPLE EMBODIMENTS

Figure 1:
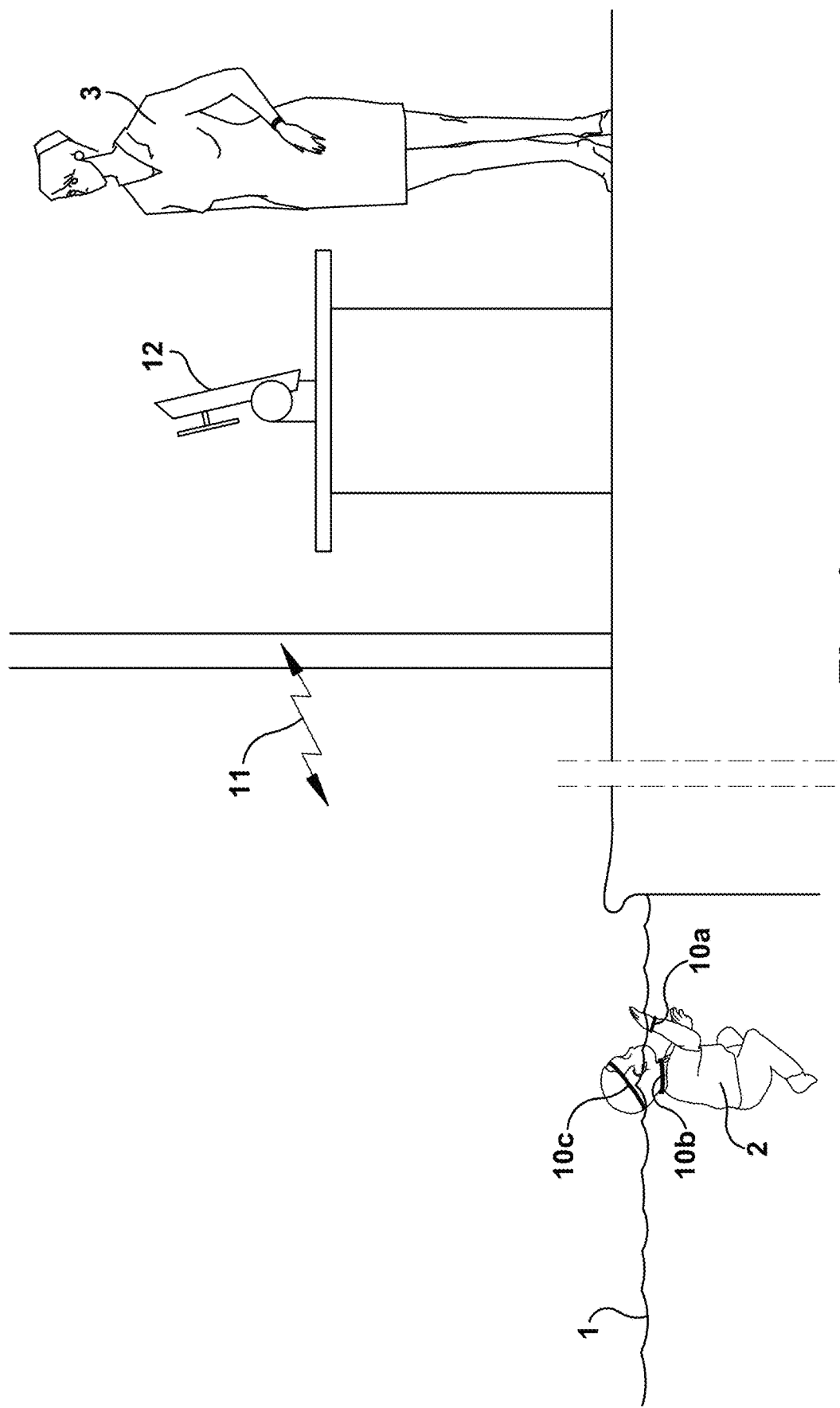
FIG. 1 is a schematic drawing of an example application of one embodiment of a downing detection system.

The process of drowning is one that can be detected by monitoring the activities of an individual who is in a body of water. There are a number of tell-tale signs that a drowning may be taking place. One purpose of the device or system of devices disclosed herein is detecting these potential signs of drowning, and providing an auditory, visual, or other warning to others in order to initiate a rescue.

The process of drowning is one that is often improperly characterized by the media, and misunderstood by many people. Most people think that a drowning victim will loudly yell for help, and splash uncontrollably, and those are the signs that are typically watched for by people such as parents watching their children. However, the truth is that a person that is in the process of drowning typically portrays what is called an "Instinctive Drowning Response". The symptoms of such a response typically include a plurality of the following symptoms:
  Head held low in the water, mouth at or near water level and alternately sinking below the surface and reappearing above the surface of the water, or sinking in the water;
  Head tilted back with mouth open;
  Eyes glassy and empty, unable to focus, or eyes closed;
  Hair over the forehead or eyes;
  Eyes open, with fear evident on the face;
  Hyperventilating or gasping for breath; quick inhaling and exhaling while mouth is above surface of water; Expelling water from the mouth; excessive coughing with expulsion of water;
  Difficulty in waving for help, and/or instinctively pressing down on the surface of the water in an attempt to rise above the water;
  Trying to swim in a particular direction but not making any headway; Staying stationary or gripping tightly and uncontrollably to another person or object;
  Trying to roll over on the back to float, or the body remaining upright in the water;
  Uncontrollable movement of arms and legs, rarely out of the water and often held vertically;
  Attempting to make a "ladder climb"; and
  Inability to call for help or make substantial sounds or noises.

Often, prior to the "Instinctive Drowning Response," an individual may show signs of aquatic distress by portraying the signs erroneously thought by the public to indicate drowning, but these signs tend to disappear quickly once the process of drowning has actually begun. Hence, the transition itself can signal a problem.

Once the process of drowning has begun, there is a limited amount of time to prevent death. Typically, the symptoms described above will last from seconds (about half a minute), to minutes (e.g., two minutes), after which the individual will sink below the surface, after which the individual has only precious few more minutes before death will occur, typically within 5-10 minutes or so.

Even after the individual becomes unconscious, the success of revival is greatly improved the quicker that the individual is rescued. If the drowning individual has sunk below the surface, it is even more difficult for surrounding persons to detect that the individual is drowning, as he or she may no longer be readily visible, and thus any direction to surrounding persons that somebody is in distress and provide an indication to search for such an distressed individual increases the chance of finding the drowning individual prior to death, and thus increases the chance of saving his or her life.

Accordingly, an individual who is portraying one or more of the above listed symptoms may be in the process of drowning, and hence in need of rescue. Because these drowning symptoms are more often the absence or the diminishing of activity and sound, rather than their presence or increase, it can actually be difficult for persons who are nearby to detect that a drowning is taking place (i.e., "out of sight, out of mind"). The lack of sound or activity often fails to draw one's attention. Furthermore, designing a device to detect drowning has been difficult for the same reasons: detecting the presence of symptoms tends to be easier then detecting their absence or reduction, and because the process tends to require comparing recent past activity to present activity to detect the differences.

However, advances in sensor and computer technology can be utilized to provide a device or system of devices that can be useful in detecting the process of drowning in time to rescue the individual before death occurs. Any combination of the above listed drowning indicators can be used to monitor an individual to determine whether they are in distress. Thus, sensor data, such as video, audio, motion detectors, heat detectors (infrared), etc. and comparison to like historical information can provide data that can be analyzed to determine that one or more of the above symptoms of drowning are present. Any of the systems and methods discussed below can implement this analysis using software executing on a computer for analyzing the sensor data. Because modern computer systems can store large amounts of historical data, comparing present activities with past activities are now possible, in particular with the currently available fast processing and communication technologies. Although human beings are not well equipped to detect these symptoms, computers can be programmed to do so with high confidence of accuracy.

There are two basic approaches (or systems of devices) disclosed in this application that can be useful in detecting the drowning of an individual, along with a third approach that combines features of those two basic approaches. The first approach utilizes one or more sensors that are worn by a swimmer (or anybody who is at risk of entering water). In this approach, for at least some embodiments, the entire device can be worn by the individual, with no external communication being necessary. The second approach utilizes equipment that remotely (from the swimmer) monitors a swimming (or other water) area from a location in or near that area. Of course, these two approaches are not mutually exclusive, hence the third approach combining them is also discussed.

Swimmer Sensor-Based First Approach

The first approach utilizes one or more devices worn by an individual, such as a child who is swimming, to obtain various swimmer status data (as discussed below) for analysis. Such device(s) would contain one or more waterproof sensors, and those sensors should be worn in locations that best detect the symptoms of drowning. Typically, one such location would be around the neck of the user to detect when the head has gone under water, such as by wearing the sensor on a tight necklace or strap around the neck or on the head, such as goggles or a mask; another such location is around the wrist, such as on a wrist band or as part of a waterproof watch, to detect when the arms stop flailing or are held under water for a long period of time; or on the body, such as on a flotation device, such as a flotation vest, or on a swimsuit, to detect swimmer motion, sounds, etc. Such devices can be called "swimming detector" devices for detecting the swimming status of a swimmer wearing the devices.

The swimming detector can utilize one or more of a number of such sensors to detect situations and collect information that can be used to determine if the symptoms of drowning exist. Any one or more of the following sensors could be utilized (this is not an exclusive or exhaustive list, as other sensors could be utilized as well):

A GPS sensor can be used to detect the location and motion of the individual;

An accelerometer can be used to detect motion of the individual and/or detect the orientation of the individual;

A gyroscope can be used to detect the orientation of the individual;

A water and/or air detecting sensor can be used to detect when the device is above water, and when it is below water (such a sensor might measure conductivity, or temperature, etc.);

A wear status sensor can be used to detect whether the individual is still wearing a flotation device or still wearing goggles (by measuring break in a band, for example, or thermal measurement);

A temperature/heat sensor can detect temperature of the individual and/or the surrounding environment;

A light sensor can be used to detect light in, and out of, water;

A sound sensor can be used to detect surrounding sound, and in particular any sounds made by the individual, and such a sensor might also detect being above and/or below water;

A cardio-sensor can be used to detect the heart rate of the individual;

A respiratory sensor can be used to detect breathing rates and/or the depth of breathing of the individual;

Active sensors can detect reflective or transmitted information or energy, and

Pressure and/or light sensors to determine a potential depth in the water.

In at least one embodiment, all of the components of the device are worn by the swimmer, and thus the unit is self-contained and need not communicate with any external devices. In such an embodiment, a processor would be provided on the device to determine when the sensor data indicates that the swimmer may be in distress, and an alarm indicator (such as a light and/or loud siren), also provided on the device, will notify potential rescuers of the problem. In such a device, a battery or solar power source or both would be used to power the device. As an option, even this self-contained embodiment might provide the ability to wirelessly send a distress notice to an external device, such as a cell phone or external alarm device, to notify specific third parties.

In at least a second embodiment, a swimming detector device would have some type of transmitter to communicate with a base station (base unit). Such a transmitter will most likely utilize RF transmissions, but infrared, LASER, SONAR, or other transmissions may also be possible. Such a transmitter would preferably be able to communicate with the base station when under water, but embodiments that do not require such a capability are also discussed.

For the second embodiment, the swimming detectors may have some rudimentary computation capability in order to determine what information to send to the base station, but it is contemplated that it is the base station that will provide most of any needed computer processing capabilities. The base station will receive information from the swimming sensor regarding the status of the one or more sensors and any detected parameters, and by analyzing that information, the base station will make a determination of whether the process of drowning is suspected and thus the swimmer is considered in distress. The processor would do so by analyzing the sensor data to detect one or more of the drowning symptoms discussed above.

When it is determined that the individual may be in distress, such as in the process of drowning, the base station will attempt to notify persons in the area (potential rescuers), such as by emitting a loud alarm, flashes of light, a combination of both, or some other indication to warn surrounding persons that a drowning may be taking place, and to indicate that the area should be searched, and a rescue attempted. It may call a parent's cell phone, for example. False alarms should be avoided as much as possible, and the base station can be provided with one or more intermediate alarms that are indications that a person might be drowning, with the alarms getting progressively louder, or changing pattern (such as going from intermittent to continuous, or changing color) as drowning progresses or becomes more likely.

In essence, the more types of sensors that are provided on the swimming detector device, or spread out on the swimmer by using a plurality of such detectors having the same, or different, sensors, the more accurate a determination of drowning likely can be (based on utilizing more than one drowning symptom, for example), but the more expensive (and perhaps more delicate) the device becomes. Thus, some balance is desirable, depending on current costs of the sensors, the intrusion of wearing the sensors, and other factors. A line of products of various price ranges can be provided to make the technology available to persons of various income levels.

For example, in its simplest form, the system can be adapted to detect how much of the time a specific sensor is above water, and how much of the time that sensor is below water. Clearly, such an above/under water sensor should be provided on the swimmer at a location that tends to be above water at least some portion of the time the swimmer is not in distress, but that us under water for a longer portion of time when the swimmer is in distress. Also, long periods completely under water, and long periods completely out of the water, can be detected. Such a sensor might be placed on the head or neck of the swimmer (such as in a necklace or neck strap), or on the wrist of the swimmer, or in or on swimmer goggles. Less preferable, but an option, is to put the sensor in or on a floatation device, or bathing suit, of the swimmer.

A number of sensor types could be utilized for such a system. For example, a very simple device would have a base station adapted to merely detect the presence and absence of a transmission, such as RF or infrared or SONAR or LASER, where such a signal is present (or determined to be sent) when the sensor is above water, but not when the sensor is below water, or where the water attenuates the signal, a situation that can be detected by the base station. The base station would determine when the signal is absent (or attenuated) far more often than expected (e.g., by comparing the integration of the signal available time to a threshold value), or when the signal is totally missing or continuously attenuated.

Such an underwater sensor might be as simple as a device that transmits a signal that cannot exit water (e.g., by being absorbed or overly scattered by the water, or that is attenuated by the water), or that is not sent when the sensor detects that it is below water. A sensor might detect whether it is below water by monitoring ambient sounds, detecting localized conductivity, monitoring ambient light, etc. A "smarter" sensor may use analysis of the signal to determine this situation.

In such an embodiment, the base station would have relatively simple processing capabilities. For example, the base station could merely integrate the transmission signal, and provide an alarm when the signal indicates that the sensor is underwater more often than would normally be expected, or is underwater for longer durations than expected, or where it is determined that the sensor is "bobbing" in and out of the water in a way that does not indicate typical swimming or water play. As discussed above, the alarm could be made progressively more intense as the base station determines drowning is more likely occurring, such as by transitioning to long periods underwater.

The base station might also be programmed to determine that a previous determination of drowning was false, and cancel any alarm, when the sensor returns to expected activity. And the base station can compare past activity of the swimmer with present activity, and use drastic changes in activity to determine that a swimmer is in distress. For example, if a very active swimmer suddenly ceases activity, this is a strong indication that there may be a problem, and thus such situations can be used to determine a distress situation.

More complex embodiments that are more likely to more accurately detect a potential drowning event can be provided by utilizing additional sensors, or utilizing the above sensor in a more complex manner, or using more historical information or specific information about the swimmer.

For example, the base station may monitor whether the monitored values imply that the swimmer is actively swimming and playing (continuous variations in the transmissions), or unusually stationary (more steady transmissions) which could indicated a problem.

For another example, the base station may be able to determine the proximity of the swimming detector, such as by calculating a distance based on signal strength. Furthermore, if a sound detector is used to determine when the detector is under water and when it is not, such a sound detector can also monitor any sounds issued by the swimmer (it might even be adapted to recognize the voice of the particular swimmer). In such a case, the base station would be able to use the information about the voice of the swimmer in addition to the submersion time to better analyze the circumstances. For example, if the base station determines that the submersion time is unusual, but that the voice of the user indicates normal play, an alarm might be avoided, whereas if the device detects that the person was loud, but suddenly silent (or panting and gasping), along with unusual length of submersion or cyclic submersion, the base station might more accurately determine that a drowning event is occurring.

By adding additional sensors to the swimming detector in addition to the underwater sensor, additional signs of drowning can be monitored that can be utilized by the base station as well.

For example, adding a GPS sensor or accelerometer can be used to determine that a swimmer is no longer moving much, but is primarily stationary, which is a further indicator of potential drowning activity. By using a GPS sensor in both the swimming detector and a base station, distance can also be calculated, although this might also be accomplished by merely noting a distance when the device is powered up, and monitoring changes in location.

An accelerometer or gyroscope or compass or other orientation detector can be used to determine that the swimmer is unusually vertical for long periods of time, or horizontal for long periods, or at least not moving in orientation, or likely merely drifting, any of which might indicate a drowning is occurring. A respiratory and/or heartbeat sensor can detect sudden gasping of breath, greatly increased or decreased heart rates, or the cessation of breathing, any of which can indicate potential drowning events.

Furthermore, an advantage might be obtained by utilizing more than one sensor on the individual to provide further data for analysis. For example, utilizing both sensors on a wrist strap and on a neck strap can determine relative differences between those sensors that might further increase the accuracy of determining a drowning event. For example, if wrist sensors determine that the swimmer is likely swimming a swim stroke, even though the neck sensor is underwater for long periods, a drowning event is not as likely as when the wrist sensor is more stationary or continuously underwater, or "bobbing" as might occur when the user is likewise bobbing in and out of the water. Also, a sound sensor might detect the regularly spaced gasps for breath used by an active swimmer doing a breast stroke, for example. But when one sensor is consistently in the water, and the other consistently out, and when breathing is sporadic and uneven, with gasp and/or gurgle sounds, that might indicate a problem condition.

When utilizing small sensors, sensors may be incorporated into clothing, such as swim suits, headbands, goggles, snorkels, etc. in order to avoid requiring that discrete sensors be worn by the users. Such sensors may have embedded batteries, use solar cells, collect power from RF signals or temperature differentials, or obtain power from any of a number of additional alternatives.

By utilizing a plurality of the above sensor types, and by providing increasingly complex analysis in the base station (utilizing a computer program running on a processor, for example), the determination of the existence or absence of a drowning event represented by the drowning symptoms listed above can be made more accurate. For example, if it is detected that the swimmer was being loud and very active one moment, but suddenly became relatively quiet, staying in one place, gasping for breath, and/or spending an inordinate amount of time underwater, and perhaps with a greatly elevated (or reduced) heart rate and/or with and unusually static orientation (e.g., vertical or horizontal), the base station can determine with good confidence that a drowning or other distress event is occurring, and issue an immediate and intensive alarm.

However, if some indicators might tend to favor a drowning event, but others clearly negate such an event (e.g., the child is underwater a lot but breathing normally or the heart rate is normal for such exertion), the system may determine that drowning is less likely. In such cases, the base station may issue only a warning alarm to indicate that the parent or guardian or other person should check on the swimmer. Such a warning alarm might be an intermittent alarm (e.g., a series of "beeps" or "flashes"), or a lower intensity alarm. Such a warning alarm might require a reset on the base station to cancel the alarm, indicating that the situation is all-clear.

A learning mode, as discussed in more detail below, can be used to modify the importance given to these various events, to make the system even more accurate. In particular, historical information can be used to compare activity from one moment to the next, and false alarms can be identified and mitigated in the future by modifying the weights that are placed on various data parameters.

Finally, the device should monitor for very unusual events strongly indicative of a drowning, such as an individual being totally underwater for more than a minute, but stationary, in such cases a maximum alarm should be sounded, as few individuals stay underwater for more than a minute, and even fewer stay in one place when doing so.

The system could also monitor other situations that call for a check on the swimmer, such as where the sensor may have been removed from the swimmer, or damaged, or detecting events that are not plausible in normal circumstances, or that are historically out of the norm. The principle of "better safe than sorry" should be utilized to tend to issue alarms when problems occur, allowing for silencing of false alarms. The alarms for serious problems can be made louder and more intense that the alarms indicating a check situation.

It is preferable that the analysis be done in a way that events indicative of normal swimming are watched for, as well as events indicative of potential drowning. Anything that falls outside of a normal event should be flagged with some type of alarm or notification, even if the event is not consistent with drowning. For example, losing contact with the swimming detector, or rapid increases in distance between the base station and the swimming detector, or a large distance between them, should probably lead to a notification, as such events urge caution and possible danger, such as going too far out into a lake, being caught in a rip current, or an abduction, for example.

Furthermore, the system would likely be user-programmable to a certain extent, to tailor the system to particular swimmers and observers. For example, a detection threshold might be user-configurable, so that the device can be tailored to the behavior of specific users (this setting might be different for each swimmer being monitored by a particular base station for even more flexibility and customization). Thus, swimmers who spend a lot of time underwater might require a higher threshold for underwater monitoring than swimmers who hate to submerge. Also, settings can be age-related. In fact, presets based on age, swimming ability, type of pool or swim area, etc. can be utilized to customize the system to a particular swimmer and/or to particular swimming circumstances.

Such customization may provide variances on the thresholds for various sensors, depending on the current swimmer or circumstances. For example, young inexperienced swimmers tend to be noisier, splash more, avoid submersion, move slowly and more randomly, etc., whereas older, more experienced swimmers, tend to spend more time underwater, move faster and less randomly, are more rhythmic in their actions, etc. The analysis can be adapted to take these features into account, thus leading to a more accurate determination of drowning based on the characteristics of the swimmer(s) being monitored.

One or more embodiments where all functionality is contained in one or more devices worn by the swimmer can be provided, although such embodiments may be less desirable, as such alarms provided on the swimmer may be muted when underwater or not heard by those in a position to rescue the swimmer, and such a system can't detect proximity to a base station, which can provide useful information and be placed near a potential rescuer. Thus, a system having a separate base station near the swimming area monitoring one or more swimming detector devices provided on the swimmer(s) is likely preferable.

Any of the above devices might also include "panic switches" accessible by the swimmer, for manual activation for triggering an alarm in a base station. Such switches might also be used by the swimmer to cancel an alarm, such as by entering a particular cancel code, for example, or a long hold down of the button.

Location detecting of the swimmer would also be a useful function, such as providing a "beep" or light on a swimmer detected as being at risk. When the base station detects a drowning event might be occurring, it can activate a light or sound transducer located on one or more of the swimming detectors, or on some other device worn by the swimmer. This would serve the dual purpose of aiding in the location of the swimmer, and notifying the swimmer that the base station has determined that there is a problem, whereby the swimmer might activate a false alarm button on one of the devices, or else change his/her behavior, when there is a false alarm. Alternatively, if a GPS device is provided on the swimmer, it could be used to pinpoint the location of the swimmer to the extent of the accuracy of the GPS system currently in use. Alternative, a type of "homing" signal could be transmitted by one of the swimming detectors to aid in the location of the swimmer, in concert with a detector at the base station, or as a separate device. Such features would be particularly useful in large swimming areas, such as in lakes or oceans, for example.

It would be beneficial to adapt any of the above embodiments in a manner to support a plurality of swimmers in a given location, either using a common base station, or where each swimmer is associated with a specific base station, or a combination of these. For example, in a public swimming area, each parent would likely want to monitor their own one or more children with their own base stations.

Accordingly, pairing swimming detectors (i.e., pairing swimmers) to base stations would be useful, so that specific swimming detector(s) worn by a given swimmer are tied to specific one or more base stations to specifically identify that swimmer. Pairing devices is well known, and can be done in a number of different manners, such as by using a Bluetooth protocol or some other protocol where the swimming sensor can identify itself using a unique identification number or code that is provided to the base station during transmission. If the swimmer is wearing more than one detector, all could be identified as representing the same swimmer. Alternatively, transmitting unique frequencies or codes that could be selectable in a manner similar to garage door opening devices and some cordless phone systems could be utilized to identify particular swimmers. To support large numbers of swimmers, utilizing code identification, rather than using unique transmitting frequencies, is likely the preferred method of associating detectors with swimmers.

Being able to associate a swimmer with the detectors being worn by that swimmer is particularly important when more than one swimmer is being monitored, and each swimmer has more than one detector, so that the base station can associate the appropriate sensor data with the particular swimmer in its analysis of the sensor data to detect swimming events. Mixing up the sensor data would give an inaccurate representation as to what is happening.

Furthermore, it would also be useful to provide the capability of a "master" base station that can monitor all swimming detectors in a given area, even in cases where the detectors are also paired to different specific base stations. In such a case, a lifeguard could monitor all such detectors and therefore monitor all swimmers wearing such detectors, and thereby be notified of any potential drowning activity, along with notification to the parents (or other guardians) of a drowning child, for example. Large pools or other public swimming areas might then require that all swimmers, or at least younger and/or inexperienced swimmers wear such devices to aid in the lifeguard monitoring efforts.

FIG. 1 shows a schematic drawing of an example system implementing the second embodiment of this first approach. A body of water 1 is shown with a drowning swimmer 2. The swimmer 2 is wearing a plurality of swimming detectors, a detector 10*a* worn on his wrist, a detector 10*b* worn on his neck, and a detector 10*c* worn on his forehead. Alternatively, any of these detectors, or additional detectors, might be incorporated within the swimmers swimsuit, goggle, etc. Alarm indicators might also be provided. Of course, a swimmer may wear only one of these detectors, or another detector provided at a different location, or any number of such detectors. The detectors might be integrated with the swimmer's swim suit. The detectors 10*a*-10*c* wirelessly communicate 11 with a base station 12 being monitored by another person 3. This wireless communication 11 can be any reasonable method of communication, many of which are discussed above, such as short-range or long-range RF, infrared, LASER, etc.

Alternatively, communication 11 may utilize a cellular network or WiFi network. Other communication options could include the use of a relay device (not shown), such as a SONAR type device where the detectors 10 communicate with the relay by modulated sound waves traveling through the water, with the relay device then communicating directly (or indirectly) with the base station 12. One or more repeaters may be utilized as desired.

Note that because water tends to absorb the energy of radio frequencies, various options can be utilized to overcome this problem. For example, sound modulation as discussed above might be utilized (especially at sub- or supersonic frequencies), or higher power RF may be used to overcome the absorption, or the use of lower RF frequencies (such as VLF), or light waves (modulated LASER or other light sources). Alternatively, the detectors can be designed to send information in bursts when the device is above water or at least nearer the surface.

Figure 2:
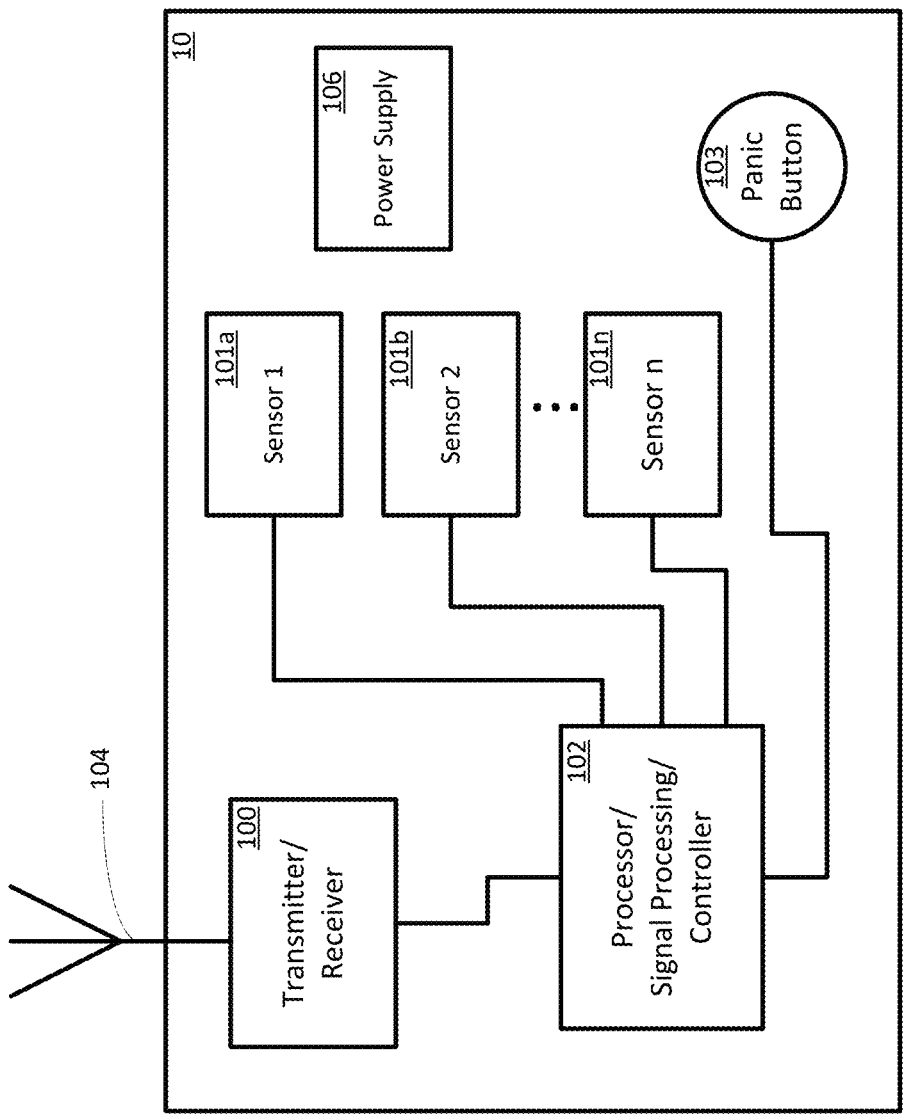
FIG. 2 is a block diagram showing an example swimming detector for the example embodiment of FIG. 1.

FIG. 2 shows a block diagram of an example swimming detector device 10 that could be utilized for a system implementing the first approach. This device 10 might be utilized for any of the devices 10*a*-10*c* of FIG. 1. Alternatively, any number of the devices 10*a*-10*c* may communicate with each other to share one detector device 10. The example device 10 has a transmitter/receiver 100 (in some embodiments, only a transmitter might be used if no reception capability is desired) with an antenna 104, and one or more sensors 101*a*, 101*b* . . . 101*n*, a power supply 106 for powering the device (such as a primary or secondary battery or solar cell), and it might have an optional panic button 103. As discussed above, audio/light transducers might be provided on the detector to be utilized to provide notification of detected problems.

In more complex embodiments, a signal processor or general purpose processor 102 would be utilized to process the signals obtained from the sensors, and perhaps to digitize analog signals, if analog sensors are utilized. The processor can also perform some rudimentary processing of the sensor data, if desired, for deciding what data to send to the base station 12 via the transmitter/receiver 100. The transmitter/receiver 100 may broadcast on one of a plurality of available frequencies to avoid interference with other devices 10, or may use an encoded communication system to avoid interference. Alternatively, the devices 10 may communicate on a computer network (e.g., WiFi) using a protocol such as Ethernet, for example.

The device 10 might also include one or more audio and/or visual transducers or indicators, such as for indicating that the device is powered up, passed self-tests (if any), whether the battery should be replaced, etc. Such indicators might also be activated in panic or other emergency situations as well.

As discussed in more detail above, the sensors 101a-101n could include GPS devices, audio detectors, water detectors, air detectors, and/or accelerometers, among others. These devices might be provided in a single location, or distributed at different locations on the swimmer. These devices are used to provide data to the base station 12 for detecting a drowning event, as discussed herein. In particular, these give information about the activities of the monitored swimmer (or the lack thereof) useful in detecting a drowning event.

Alternatively, for an entirely self-contained device, the transmitter/receiver may not be necessary, although it could be used to connect to a parent's cell phone, for example.

Figure 3:
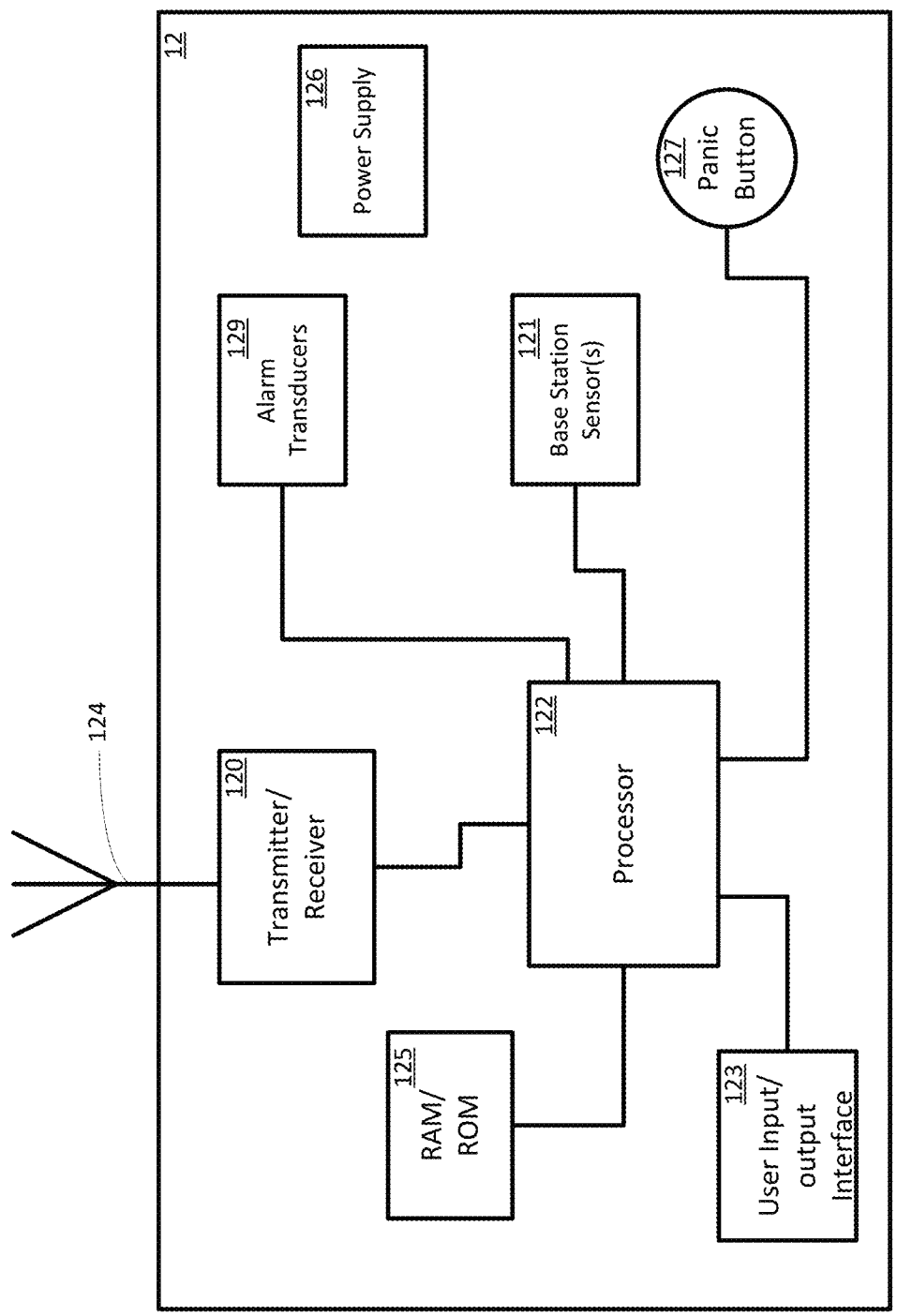
FIG. 3 is a block diagram showing an example base station for the example embodiment of FIG. 1.

FIG. 3 is a block diagram showing an example base station 12 that can be used for a system implementing the first approach. This base station has a power supply 126 for powering the unit (which might include a battery, or a supply for conditioning power from a mains, for example). The base station 12 will have a receiver/transmitter 120 with an antenna 124 for communicating with the detector 10 (directly or indirectly, as discussed above), a processor 122 with RAM/ROM 125 for storing programs and data, one or more sensors 121 may be provided for detecting status information for the base station 12, a user input interface 123 for inputting user commands and information, and one or more alarm transducers 129 for indicating an alarm condition to persons in the vicinity of the base station 12.

The processor 122 will be executing one or more programs (stored in the RAM/ROM 125) for analyzing the sensor information obtained from the device 10 (or multiple devices 10) in order to determine whether a drowning event is taking place, as is described herein. This analysis can be done utilizing one or more parameter settings that are input by users into the user input/output I/F 123 (such as a keyboard and display, or a menu-based system utilizing buttons, a touch screen, or other input device for example). Such settings are discussed in more detail elsewhere in this document. Also, the user I/F may include a panic button 127, and/or a reset button for silencing an alarm when no drowning event is taking place. The panic button 127 could be used to toggle the alarm, and thus eliminate the need for a separate reset button.

The alarm transducer(s) 129 are one or more alarm devices for notifying persons in the vicinity of the base station or body of water that a drowning event is detecting, as discussed elsewhere in this document. Such alarms could be audio (e.g., sirens), visual (i.e., strobe lights), or some other indication.

The base station 12 might be adapted to receive periodic program updates to ensure that the system takes advantage in software improvements. For example, the base station might communicate with a WiFi network or cellular network, and monitor a site for software updates, and automatically download such updates when they are available. For example, the manufacturer of the device might periodically download program updates from a remote server via the Internet, for example.

The base station 12 might have other input/output interfaces available, such as USB, Ethernet, or WiFi, for example, to connect to other devices for various purposes, such as for storing settings backups, for example, or for receiving the periodic updates. The unit will likely have a number of status indicators as well to inform the users that the device is functioning properly, or when it needs attention. This base station could be based on a Windows or Linux operating system with appropriate programming for performing the monitoring and analysis described herein.

The base station 12 might be implemented on a PDA or cell phone, or tablet computer or a laptop, for example.

Figure 4:
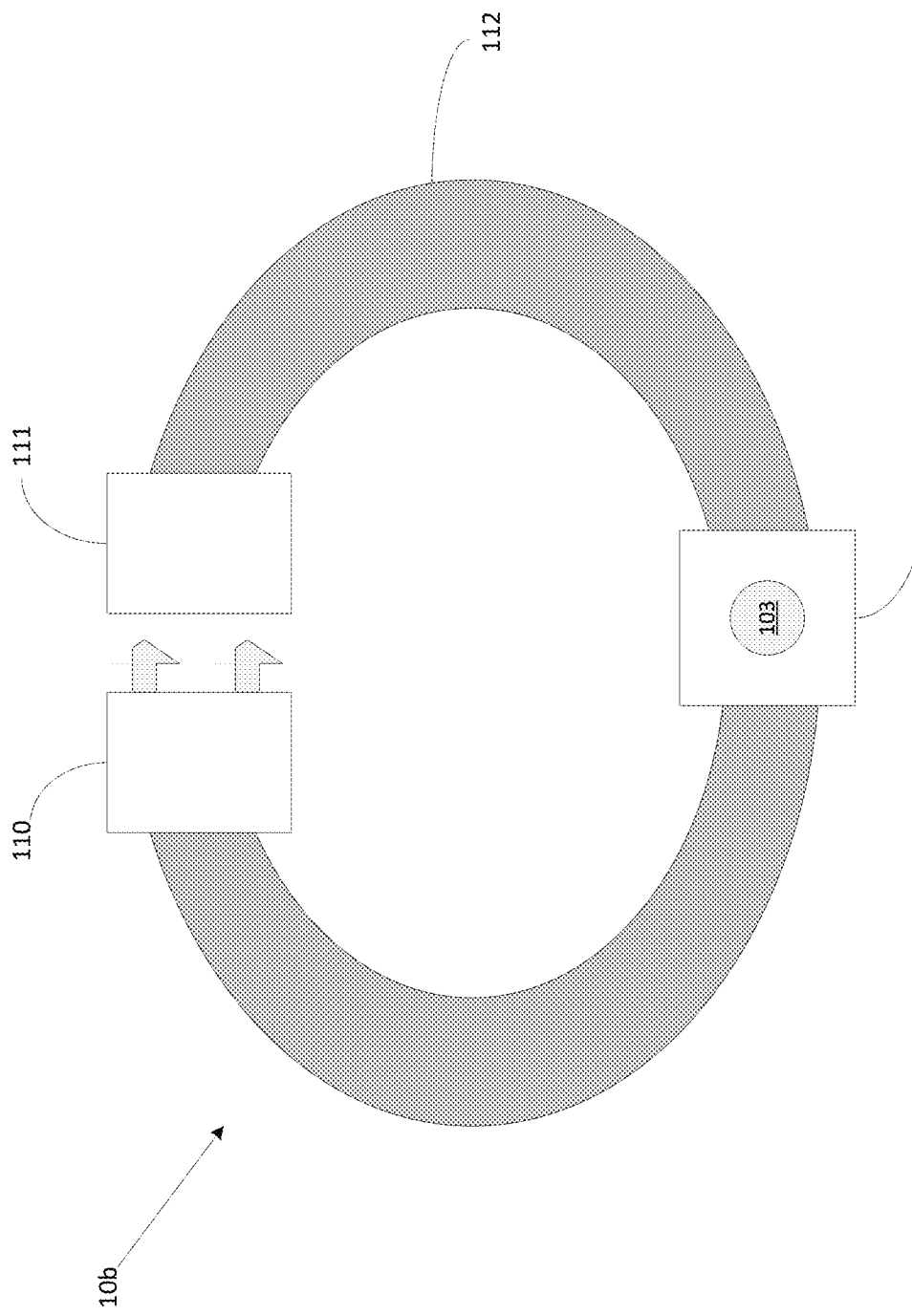
FIG. 4 is a schematic drawing of an example neck or wrist band including a swimming detector for the example embodiment of FIG. 1.

As discussed herein, the detector devices 10a-10c, among others, could be worn by a swimmer using a number of different approaches. FIG. 4 shows one such approach, where a neck band 10b (or similar wrist or arm band) is provided with the sensor device 10 mounted thereon, having a male/female buckle portion 111/110, respectively. The device 10 may have a panic button 103 provided thereon. Especially in the case of using a neck strap, the buckle, or some other portion, the device should be designed to break away under a predetermined force to prevent choking, should the strap 112 get caught on something.

The base station 12, if used, can be designed to monitor a plurality of swimmers by allowing the station 12 to communicate with a number of the detector devices simultaneously In this situation, the base station can be designed to be paired with the various detector devices in a manner similar to pairing Bluetooth devices, for example, so that the user knows that all of the swimmers are being monitored. Each set of sensors might have a unique ID to identify them. In such situations, the user interface 123 showing the number of swimmers being monitored (perhaps as a list or using icons) would be useful. The device could be programmed so that the names of the swimmers or avatars or images of the swimmers are shown with a status indicator to make monitoring the swimmers easier.

Video Monitoring-Based Second Approach

The second approach involves an external monitoring system for obtaining swimmer status data for analysis, the primary embodiment of which utilizes a video system having complex analysis capability. Such a system would utilize innovations provided in such devices as the Kinect® system by Microsoft®, which primarily relies on video and sound analysis of an area with detailed processing of the video and sound being done to determine user activities. A plurality of video cameras and/or a plurality of sound detectors can be used to enhance the capabilities of the system, and to provide a three dimensional viewpoint in both sound and sight.

Such a system interprets 3D scene information, such as might be obtained from a continuously-projected infrared structured light. This is basically a 3D scanner system using light detectors or cameras.

The Kinect sensor uses a horizontal bar connected to a small base with a motorized pivot and features an RGB camera, depth sensor and multi-array microphone running proprietary software which provides full-body 3D motion capture, facial recognition and, in some embodiments, voice recognition capabilities. The Kinect sensor's microphone array enables the gaming platform Xbox 360 to conduct acoustic source localization and ambient noise suppression.

The depth sensor(s) are comprised of an infrared laser projector combined with a monochrome CMOS sensor, which captures video data in 3D under any ambient light conditions. The sensing range of the depth sensor is adjustable, and the Kinect software is capable of automatically calibrating the sensor based on ambient circumstances and activity, and based on the player's physical environment, accommodating for the presence of furniture or other obstacles.

The Kinect software technology enables advanced gesture recognition, facial recognition, and voice recognition, all features that can be useful in this second approach for safety monitoring. Kinect is capable of simultaneously tracking up to six people, including two active players for motion analysis with a feature extraction of 20 joints per player. However, the number of people the device can "see" (but not process as players) is only limited by how many will fit in the field-of-view of the camera.

Accordingly, the system that is adapted for this second approach could use many of the features of a system such as the Kinect system to monitor a plurality of swimmers. Such a system might utilized more powerful camera and microphone systems, and require that the software be customized, but the Kinect system provides a good starting point, and could merely be customized for this application.

Due to the limitations of the current technology, e.g., it being limited to monitoring the active motions of only a subset of the number of persons it can recognize, by partitioning the monitored area into "zones" and using a plurality of monitoring devices (i.e., a plurality of monitoring subsystems and base stations), or in some cases using a plurality of processing devices (e.g., a plurality of processors, or virtual processors) provided in a single base station, these issues are overcome by spreading out the monitoring and/or processing among a number of subsystems and monitoring each zone independently, or substantially independently.

When monitoring is partitioned by geographical area (i.e., "zoned"), additional processing could be provided to "pass on" swimmers from one area to another (from one zone to another), and the monitoring could be provided in an intermittent manner, so that any particular swimmer or subset of swimmers is only monitored while that swimmer or subset of swimmers is in the pertinent zone being monitored by that particular subsystem, and the subsystem moves on to monitoring another swimmer or subset, in sequence, as new swimmers enter and leave the zone. Thus, swimmers can be monitored over a larger geographical area, or more swimmers can be monitored in a given area, than could be monitored using a single limited system.

Alternatively, for a given zone, only those in the particular zone being covered by a subsystem may be monitored by that subsystem, and when a swimmer leaves a given zone, that person is no longer monitored by the subsystem monitoring that particular zone. In such a situation, each zone is monitored independently without concern about what is happening in other zones.

When a potential problem is identified with a particular swimmer, the system can be programmed to continuously monitor such a problematic swimmer until the problem is ruled out, or an alarm is issued. This might, in some situations, require a subsystem to cross a zone to continue to monitor swimmers considered in danger, in particular in embodiments that cannot pass off swimmers from one zone to another. Thus, the system can "widen" a zone when needed to monitor a problematic swimmer. In such situations, more processing may be allocated to those swimmers that are suspected of being in danger to watch them more "closely" with a concurrent reduction in processing for swimmers that are determined not to be in distress. Alternatively, rather than a subsystem following a problematic swimmer outside of its assigned zone, the subsystem might merely notify other subsystems in adjacent zones (or in the adjacent zone to which the swimmer was determined by the subsystem to be heading) to be in a heightened alert state to watch for the problematic swimmer and do an initial assessment and close monitoring of that swimmer. If no such swimmer is found, then an alarm can be triggered. "Zones" that are outside of swimming areas can be assumed safe havens, however, and thus if a problematic swimmer has exited a zone into a safe haven, no alarm would be triggered.

As another alternative, if a problematic swimmer leaves or otherwise disappears from a zone monitored by a subsystem, the subsystem might be programmed to assume that there is a problem and thus issue a warning regardless of what happens to the swimmer outside of the zone (but this is less desirable due to the chance of false warnings). Thus, it is preferable to continue to monitor the swimmer in the new zone.

Alternatively, the information about a problematic swimmer might be passed from the subsystem monitoring a swimmer in the current zone to the subsystem monitoring the swimmer in the new zone (to which the swimmer was determined to be headed). Thus, if the swimmer leaves the current zone to enter a new zone, the subsystem monitoring the current zone notifies the subsystem monitoring the new zone of the transition, and passes data about the swimmer to the subsystem monitoring the new zone. Such passing off from a subsystem monitoring one zone to another subsystem monitoring another zone can be done by passing the information stored about the swimmers changing zones, their status information (such as whether they are considered being in trouble), and any other information that might be desirable to pass on to continue to monitor the swimmer(s). This can be done by passing data from one subsystem to another via a network or central control system (see FIG. 11 for an example), in cases where subsystems are individual systems that operate substantially independently to monitor their zones. By sharing data by network, the subsystems can better keep track of all the swimmers as the swimmers move from one zone to another.

Alternatively, passing off can be done virtually in more complex systems (not requiring mostly independent subsystems) by passing stored data from one processor (or virtual processor) to another, or by flagging stored data for use by another processor (or virtual processor), so that the processor or virtual processor monitoring the newly entered zone can begin monitoring the swimmer, while the processor or virtual processor monitoring the previous zone can stop monitoring the swimmer who has moved out of the zone.

Note that monitored zones would most likely be geographical in nature, but zones might be alternatively defined to contain certain fixed subsets of swimmers that are monitored regardless of location. In the latter case, each subsystem monitors a particular subset of swimmers over the entire swimming area, following them wherever they go. In such a situation, swimmers are tied to a particular subsystem. Of course, combinations of geographical zones and swimmer subset zones might also be established. This approach may be more useful for portable systems, in particular for monitoring specific individuals in public swimming places (see FIG. 10 and description for such a system).

Any such systems could be adapted either to identify one or more specific individuals (such a parent-controlled systems), or else to monitor all individuals in a given area. Any of these systems would primarily be adapted to determine when an individual is showing signs of drowning in a manner similar to those discussed above for the first approach, such as by monitoring when the individual is underwater too long, or when the individual is gasping for breath, in an unusual vertical or horizontal posture, monitoring hand/arm motions and head motions, and/or when the individual has disappeared from view by going underwater and does not reappear in a sufficient amount of time.

Cameras that detect infrared (heat) could be used as an alternative, or in addition to, cameras that record visible light. Thus, by monitoring infrared signals, such a system could detect that a person has gone under water by the loss of the heat signal that the portion of the person above water would typically broadcast. Alternatively, RADAR signals, SONAR signals, or other active signals could be broadcast out to the body of water to monitor those swimming by monitoring the reflected signals using a receiving device. Because many of the signs of drowning involve a transition from very active motion with lots of noise and splashing, to a static, less active, more quiet activity during drowning, monitoring for such a transition would be useful to detect a drowning condition, and is very similar to the information that must be monitored for controllerless game play in the Kinect system (e.g., body motion, hand motion, location, personal recognition, etc.). In particular, if the normal activity does not resume within a reasonable amount of time, such as about a minute, or if it gets worse, with the person spending consecutively more time underwater or completely disappearing, such detection would be utilized to issue a drowning alarm.

As in the first approach, the alarms for this second approach can be made progressive, in that as the unit determines that a drowning event is more likely occurring, the system will issue more intensive alarms, whereas detection of a false alarm can provide an "all clear" signal and cancel the alarm, such as when a person that was presumed to be drowning re-appears in a normal state and is detected by the system as such.

The advantage of this second approach over the first approach is that the system could be programmed to monitor many individuals in a given area without requiring them to wear sensors, and thus such a system would be ideal for use by lifeguards in public areas, and for monitoring larger pools or larger groups of swimmers. It also avoids the problem of forcing swimmers to wear detectors. In order to make the system operate with a reasonable amount of processing and for utilizing existing technology, as discussed above, more than one system (i.e., a plurality of subsystems) can be utilized, or the system can be modularized, so that the swimming area is broken up into regions (zones), with each region being independently monitored and evaluated, as discussed above. In such a system, persons who leave a region may be ignored if they are picked up by another region in a non-threatening state, or the system may actively pass on such persons on by having the module monitoring the previous region notifying the module monitoring that new region that a swimmer has moved, and perhaps the historical information related to that swimmer can be passed on as well. Or the system can have a central monitor (central control subsystem) that tracks all individuals' historical information for use by the other modules. Such modules may communicate with each other to monitor a swimmer moving from one region to another. A swimmer that leaves one region, but does not appear in another region, would then likely raise an alarm. However, a swimmer that has merely moved to another region can be monitored in the new region, but ignored by the other regions (at least until the swimmer moves into one of those other regions).

The cost of this second approach is the requirement of more wireless communication and more complex processing and memory storage requirements.

The use of multiple modules networked together (zoned), or a system having a plurality of processors acting as individual modules, could make this approach practical for monitoring large areas. All of these modules may be contained in a single housing, or in separate devices networked together.

As mentioned above, such a "regional" or "zoned" system can be coordinated using a central control device to monitor the state of swimmers and provide useful information to a lifeguard, such as an indication as to which region the person in distress is located. Such a system can be utilized in an effective manner, such as by having one lifeguard monitor the system, with other lifeguards watching the swimmers. Such a system may avoid the use of loud alarms, to avoid interrupting swimmers with the alarms, in particular where false alarms may occur. Instead, such a system would warn the monitoring lifeguard to check on a particular individual, who would then notify the watching lifeguards where to look for potential trouble. Such a system may include a means to zoom in on the swimmer in trouble, perhaps giving geometric directions or even a mapped location, and thus provide the lifeguards with additional information, making it easier for them to identify and find the problematic swimmer, along with giving them the ability to determine false alarms. Such a system would likely be made more sensitive to borderline situations than a system designed for home use, as its purpose is to merely direct the lifeguards' attention to possibly problematic situations for evaluation. Wireless devices, such as PDAs or cell phones or tablets, can be used as communications tools for the lifeguards to communicate with each other, and so that all lifeguards may be made aware of problem situations.

Figure 11:
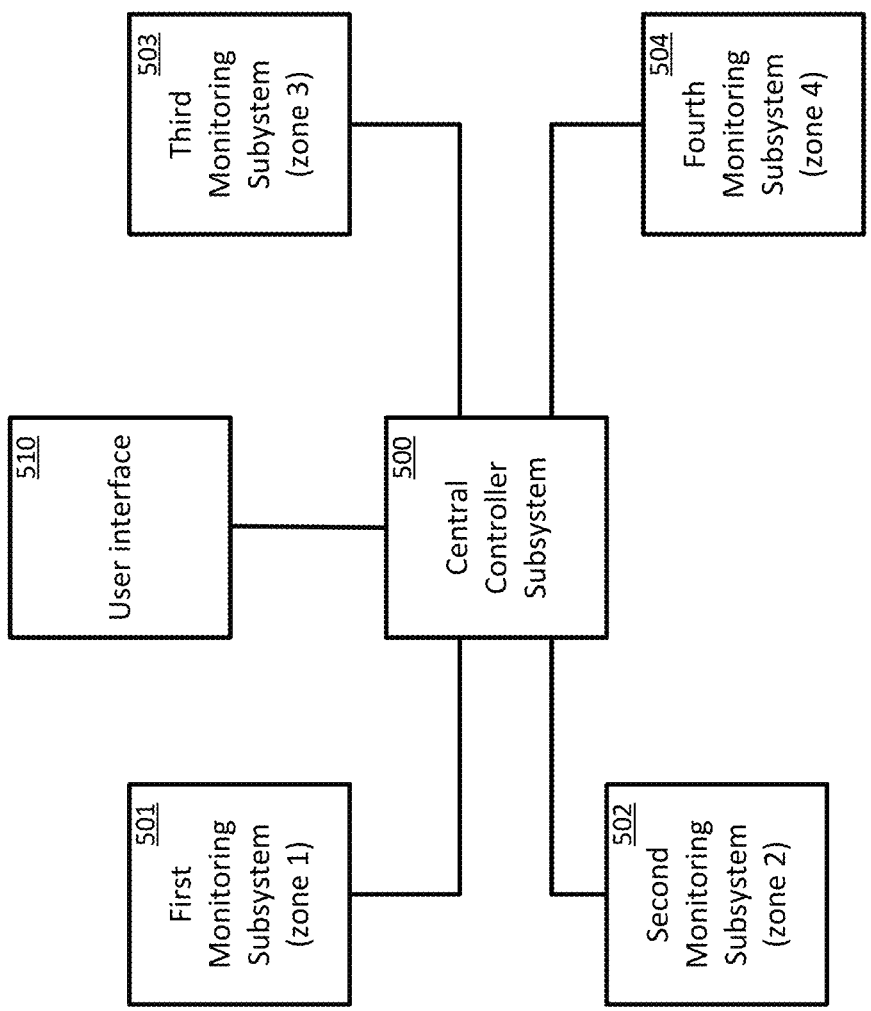
FIG. 11 is a block diagram showing an example subsystem setup using a centralized control.

FIG. 11 shows an example general arrangement of such a regional system. A Central Controller Subsystem 500 is connected to four Monitoring Subsystems 501, 502, 503, and 504, each of which is monitoring a corresponding zone using one of the subsystems described herein (e.g., video, audio, and active system monitoring, as the case may be). Of course, other numbers of monitoring systems can be used as needed. At least one User Interface 510 is provided. This user interface 510 may include a display, alarms, keyboard or touchscreen inputs, etc. to notify the user of swimmer problems and system status, as discussed herein. The system may connect to tablet computers that are used by various lifeguards, for example. These various subsystems can be connected in a wired manner (such as by using Ethernet), or in a wireless manner (e.g., WiFi, RF, etc.), or in some other manner discussed herein.

In such a system, video cameras (or other video sensors) and microphones might be permanently installed along the beach or pool, or they might be temporarily installed in a moveable manner to, in effect, "follow the crowd" as it moves along a give beach or to other beaches. The central system might be installed in a lifeguard shack, or in a vehicle to make it mobile, or it might be put in a portable laptop or tablet.

Because a regional system as shown in FIG. 11 would likely be complex and expensive, in particular if it relies on modules and multiple cameras and sound sensors for monitoring a plurality of regions to improve functioning, such a system is likely not to be economically usable by individuals for monitoring their children or for monitoring a single home pool, for example, and thus a less complex system adapted to home use can be provided for monitoring smaller areas.

Thus, similar but simplified system could be utilized by parents who just want to monitor their own children or a relatively small group of swimmers in a home pool. Such a system might provide a way to specifically identify the swimmers to be monitored, such as by using facial recognition (this would be less is less valuable to lifeguards in a public area, where the identity is less important than the location, as they are trained to spot problems). This may occur by an initial setup, where the swimmer stands in front of a video camera, and the system is notified to identify the swimmer's facial and body characteristics. The swimmer may be asked to speak to identify his/her voice, and the system may note the colors of the swimmer's suit, skin, hair, eyes, and other identifying features, clothing, and/or accessories. Then, the system can use this information to monitor those specific swimmers as they swim.

Such a system can be improved by providing identifying objects on the swimmer. If the system loses identification of a swimmer for some reason, it may provide a notification to a user to redo the identification process (e.g., a wet swimmer's appearance may change, or the swimmer may change accessories, or take off goggles, etc.). However, preferably the system could be programmed to learn about these changes as they occur by continuously monitoring the swimmers, and thus automatically update to those changes.

To enhance swimmer identification, identifying objects could be provided to the swimmer, such as an armband, headband, sensors, swimwear, goggles, headbands, bracelets etc. to aid the system in tracking particular swimmers. Such a feature would greatly simplify the processing required to monitor swimmers, and thus lead to a far cheaper system, especially cost effective for home use. Adaptations of the third approach discussed below can also be used to better identify the swimmers.

Such a personalized system would then primarily monitor the specific swimmers that were tied to (i.e., registered in) the system, allowing each parent, for example, to monitor his or her own children, or allowing a pool owner to monitor a limited number or subset of swimmers. Notifications could be sent to PDAs or cellphones of the actual parents of the children being monitored if such information is added to the system, in case they have moved from the area, such as to use a restroom. The system may use multiple cameras or sound detectors to improve monitoring as discussed herein, but cost minimization would be important. Such a system could also be transported to public areas, such as a beach, for example (see FIG. 12 and discussion), to aid parents in monitoring their own children, while avoiding the expense of monitoring others. Such a system is thus much more in alignment with the current capabilities of the Kinect system, and thus could utilize its programming capabilities.

Alternatively, rather than using a personalized system, a system may be tailored to monitor a home pool with only a limited number of people swimming in the pool (e.g., less than 12, or less than 6). Such a system would monitor all swimmers for signs of drowning for issuing alarms in a manner discussed herein.

Any such system could include embodiments to provide video monitoring capability that would pan to and zoom in on a swimmer that is determined to be in distress, to help identify the distressed swimmer to the persons that are monitoring the system. Of course, in such a personalized embodiment, a loud audible alarm would likely be provided, and all remote devices connected to the system could have alarms set off to maximize the chance of rescue. But the video monitoring system may be useful in quickly determining a false alarm (such as by detecting when activities return to normal), and resetting the system. This is particularly important with children, who may have play activities that resemble actual drowning.

In the systems of this second approach, it may be advantageous to provide video cameras and audio microphones at each corner of a rectangular pool or around a perimeter of a round or oval pool, for example, or even more for large public pools, lakes, or the ocean. Separate microphones placed in optimum locations might be used instead, or in addition to, those that may be provided with the cameras. Focused zoom microphones may be useful for noisy public areas and oceans (background noise can be removed by known processing capabilities). Stereo microphones can be used to better locate individuals. Complex sound processing can be used to determine the directions and distances from which sounds originate, improving the accuracy of monitoring the swimmers. This is particularly the case where multiple microphones are used. Recognition software can be used to determine from which individuals sound is originating, and voice recognition might be used to monitor for key words, such as "help" or unintelligible gurgling, coughing, or hacking. Current methods of speech processing by determining location of sounds as used in hearing aid technologies can be used by the system to locate and monitor specific individuals.

Cameras can be provided with pan and zoom functions to follow individuals and zoom in on those determined to be in trouble (such as based on audio processing results, video processing results, or GPS data, as the case may be). This could be done automatically by the system, and manual control or overrides might also be provided to cancel false alarms, for example.

Any of these systems could be adapted to have a learning mode, where resets of false alarms are monitored, such that the system adapts its analysis thresholds to specific pools, and even specific swimmers, to reduce the number of false alarms. This mode is also described below.

Figure 5:
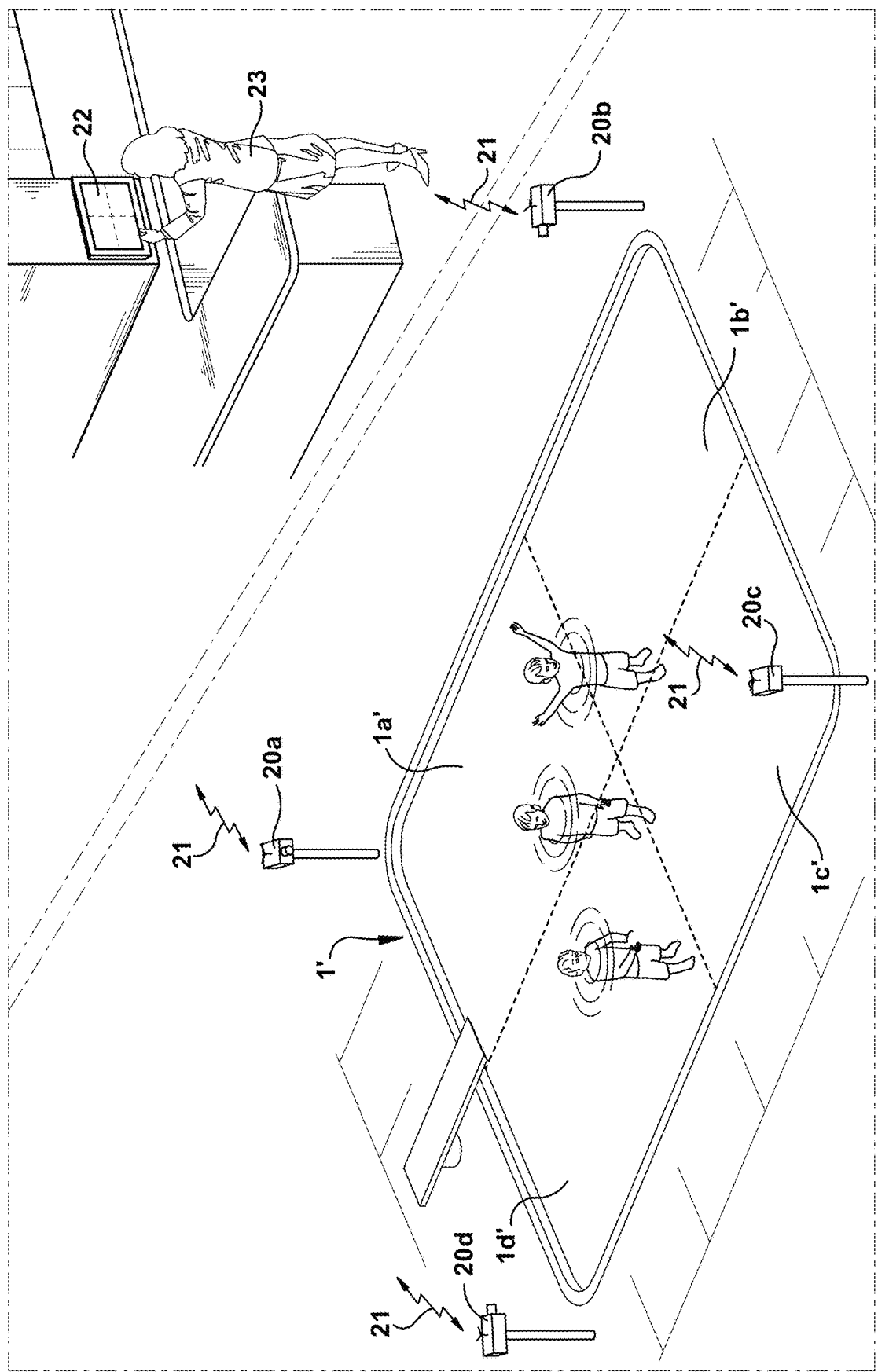
FIG. 5 is a schematic drawing of another example embodiment of a drowning detection system.

FIG. 5 is a schematic drawing showing an example application for implementing a system according to the second approach. For example, a pool area 1' is provided with a plurality of swimmers. For this example, four video sensor devices 20a, 20b, 20c, and 20d are distributed around the pool, in this case at the corners. These devices would preferably also have audio sensors (or instead, audio sensors might be distributed around the pool in other locations). Each of these video devices 20 are for monitoring a respective region (zone) 1a', 1b', 1c' and 1d' of the pool. Of course, more or fewer such sensor devices might be utilized, depending on the size of the pool, and based on financial factors and/or the number of swimmers to be monitored. In particular, one such device might be utilized for home pools that are not overly large. Alternatively, the sensor devices may be paired for monitoring regions to obtain the advantages of 3D imaging. For smaller pools, fewer zones or a single zone might be monitored.

Each of these video devices 20a-20d wirelessly communicates 21 with one or more base stations 22, such as via RF, WiFi, cellular, or some other communication method, as discussed herein. Of course, wired connections could be used as an alternative. The base station 22 is monitored by another person 23 that is responsible for monitoring the swimmers. Additional base stations can be provided for additional monitoring by others. Such base stations 22 might be implemented in a laptop, tablet computer, PDA, or a more complex computing device, depending on its processing capabilities and the state of the technology.

Figure 6:
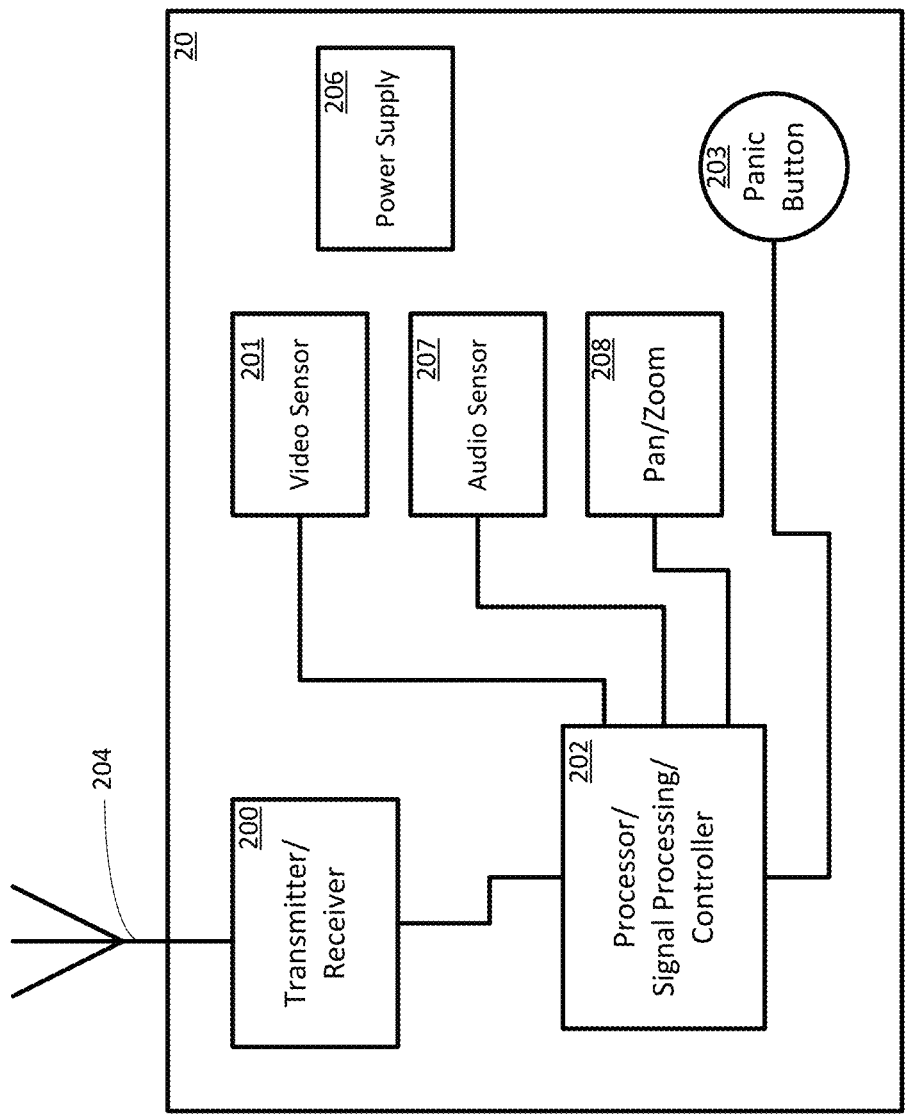
FIG. 6 is a block diagram showing an example video capture component for the example embodiment of FIG. 5.

FIG. 6 shows a block diagram of an example video device 20 that can be used for devices 20a-20d. Such a device 20 will have one or more video sensors 201 likely using one or more digital sensors (such as CCD or CMOS sensors for digital cameras, or infrared or RADAR sensors). Such video devices may monitor only visible light, but also monitoring non-visible frequencies would provide an advantage. For example, including an infrared sensor will enable the device to more easily differentiate a warmer person from the cooler water, for example, and thus is highly desirable. Alternatively, a RADAR sensor (paired with a radio wave transmitter) can be used for more active monitoring, especially in low-light situations. Active SONAR devices could also be used as part of the audio sensors.

The device 20 will have a power supply 206, which might be a battery or use a connection to a power line. The device 20 will have a receiver/transmitter 200 for communicating with one or more base stations, and may likely have a processor 202 for control and analysis functions, although more rudimentary devices may not need a processor, but may transmit the raw sensor signals (e.g., video and audio) directly to the base station. The device can have pan and zoom components 208 for providing pan and zoom functions for the video sensor (e.g., camera). The device can also have one or more audio sensors 207 for monitoring the audio environment of the pool. The device might also have a panic button 203 for use by a person near the device 20 that notices a swimmer in distress.

The processor 202 is not likely to be used for performing detailed analysis of video or audio images, although it may perform some rudimentary processing of the video and/or audio signals, although incorporation of the base station functionality into the video device 20 is possible for a self-contained unit. In most circumstances, the processor 202, if provided, will be primarily executing programs for controlling the functions of the device, such as pan and zoom, and controlling transmitting and receiving functions. The processor might also provide some video and/or audio compression, and may be a device dedicated for this purpose. Of course, RAM/ROM can be included, as desired, for storing programs and data. In more simplified designs, no processor may be necessary, in particular where limited or no pan and/or zoom functions or compression functions are provided.

Figure 7:
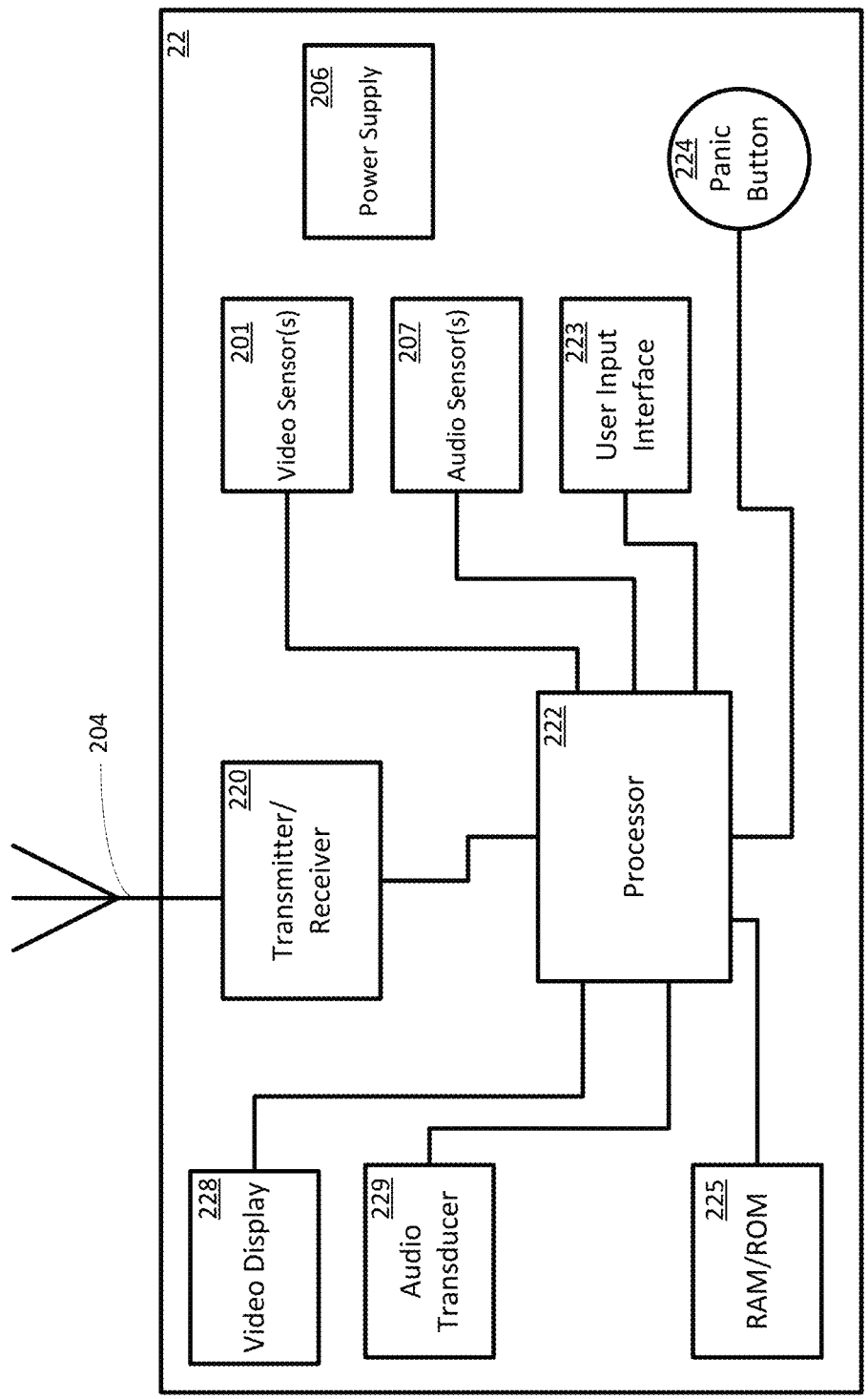
FIG. 7 is a block diagram of an example base station for the example embodiment of FIG. 5.

FIG. 7 shows an example base station 22 that might be utilized with a system implementing the second approach. Such a unit 22 would likely have a receiver/transmitter 220, audio transducer(s) 229, user input interface 223, a processor 222, and RAM/ROM 225, that would perform similar functions as the comparable components for the base station 12 (and those discussed in this section). Of course, the processor 222 would likely perform much more complex analysis utilizing the video data from the devices 20, for detecting the signs of drowning in the video, and complex programming for implementing the complex analysis would be stored in the RAM/ROM 225 for execution by the processor.

Furthermore, the RAM/ROM 225 will likely contain much more historical information, as such video analysis often requires comparing current images with a history of past images. Hence, the RAM/ROM may require a large storage capacity, such as a hard drive or its equivalent. Also, the required speed of the processor 222 and RAM/ROM 225 is likely to be higher when video processing is the primary means of analysis. Recording of video for some time period may also be desirable (providing what is effectively a video "loop"). Semi-permanent video storage might also be provided as an option. Such video may be made transferable to other devices for permanent storage, if desired.

The base station 22 may have a video display 228 in order to show a real-time video of the pool activity, and to be able to pan to, and zoom in on, a person that may be in distress, as discussed herein. This display would also provide status information to the user. Alternatively, the base station 22 may transmit information to a tablet computer, a laptop, a PDA, or a cell phone for display to the user. A user might also request that the system "zoom in" on certain swimmers that the user has an interest in. The user would input such information in the user input interface 223, which might be a keyboard, or a touchscreen interface, some switches, or a combination of these things. This unit could be based on a Windows or Linux operating system with appropriate programming for performing the monitoring and analysis described herein, or could be based on the software currently used in the Kinect system with extensions and modifications to adapt it to the functions discussed herein.

The base station 22 might also be provided with its own video sensor(s) 201 and audio sensors 207, either for monitoring its own location (such as for security, or to record evidence of who is monitoring the swimmers), or to act as its own video device 20. The base station might also be provided with a panic button 224 for manual activation of alarms, or for canceling such alarms.

Figure 10:
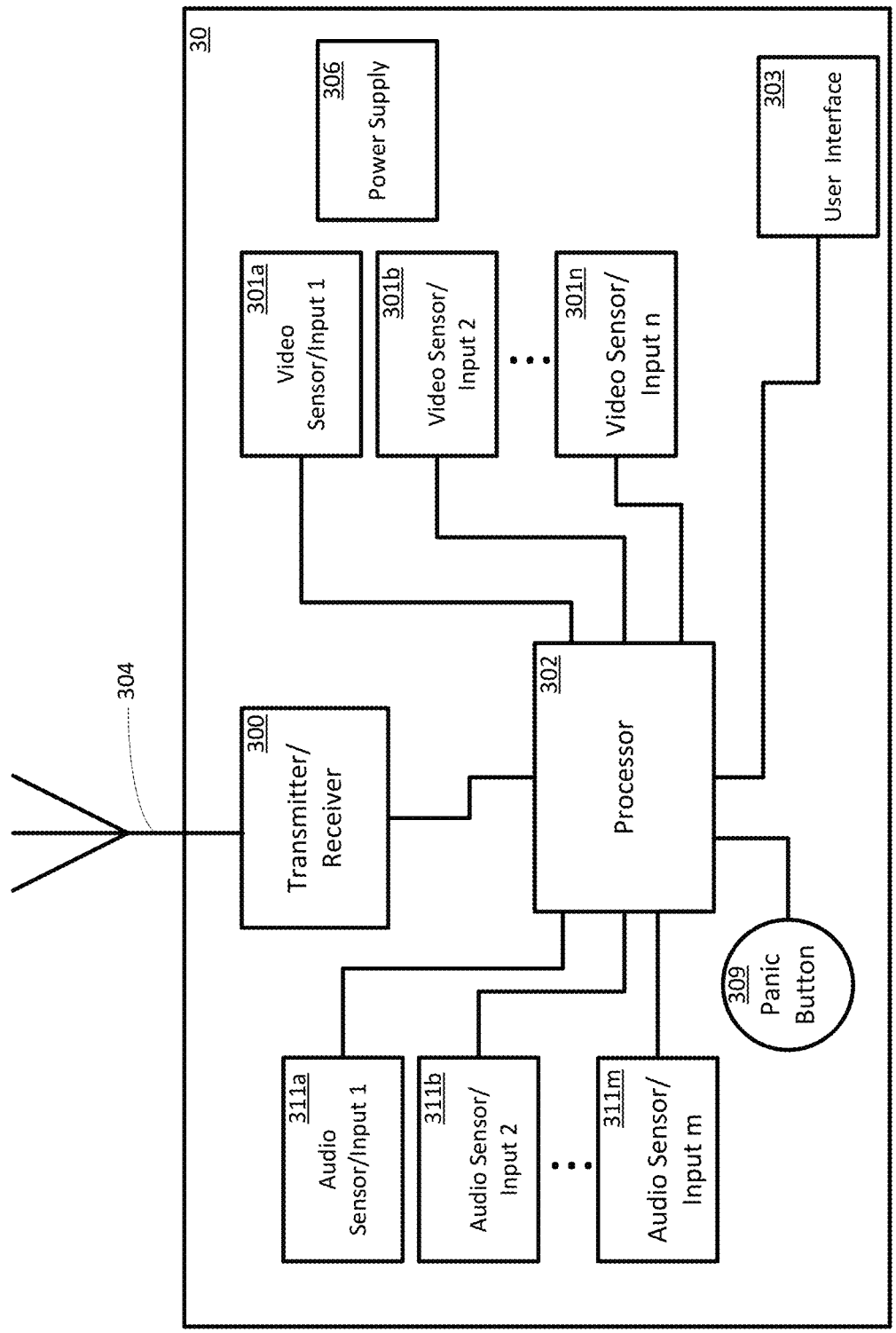
FIG. 10 is a block diagram of an example base station for a portable monitoring.

FIG. 10 shows an additional system option where a base station 30 is connected to a plurality of audio sensors 311a, 311b . . . 311m and a plurality of video sensors 301a, 301b . . . 301n. A processor 302 is connected to the sensors and to a transmitter/receiver 300. A user interface 303 is provided for input and output interfacing with the user, and a panic button 309 can also be provided. Such a system might be provided in more compact form for portability, where the sensors might be directly connected to the device. In such a situation, the transmitter/receiver 300 may be used to connect to portable devices carried by users monitoring swimmers (e.g., cell phones), or to sensors being worn by the swimmers, or both.

For any of the above embodiments, the equipment that is placed near the swimming areas will likely require waterproofing to protect the equipment from the pool water and weather, such as by sealing the equipment or coating it with a water repellant material.

Additional Approaches

A third approach can be used to combine some or all of the features of the above first and second approaches (and thus their example systems). Such a system is more like Sony's Move system for its PlayStation 3 system. In such a system, there is an external monitoring system such as in the second approach described above, but the swimmer also wears one or more sensors that are monitored ("watched") by the external monitoring system, making it easier to track swimmers. Such sensors can include any of those described above for the first approach, and/or may include a sensor similar to the Move controller in the Sony system.

Adding one or more of the sensors described in the first approach to the second approach can be utilized to increase the accuracy of determining a drowning condition. Basically, such a system would take the best of both the first and second approaches, and use them to increase the accuracy of the analysis, at the cost of additional complexity and financial expense.

Alternatively, this third approach may start with a system like in the first approach, and add simplified video capabilities, where the video is treated as if it were as separate sensor. Such a system can use video to get an overall view of pool activity, and perhaps zoom in on a person in trouble using GPS functionality, for example.

Figure 8:
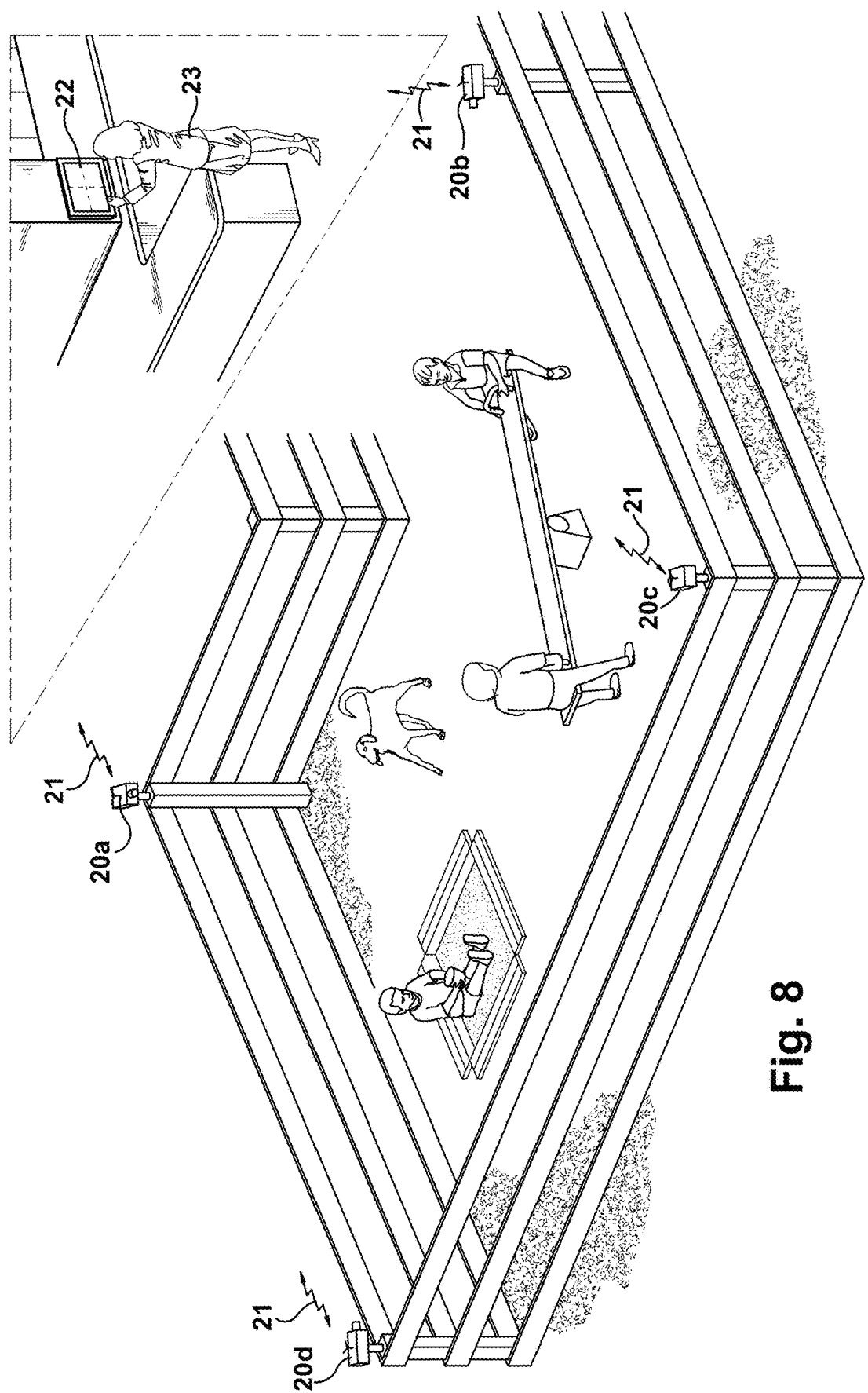
FIG. 8 is schematic drawing of an example child yard monitoring application.
Figure 9:
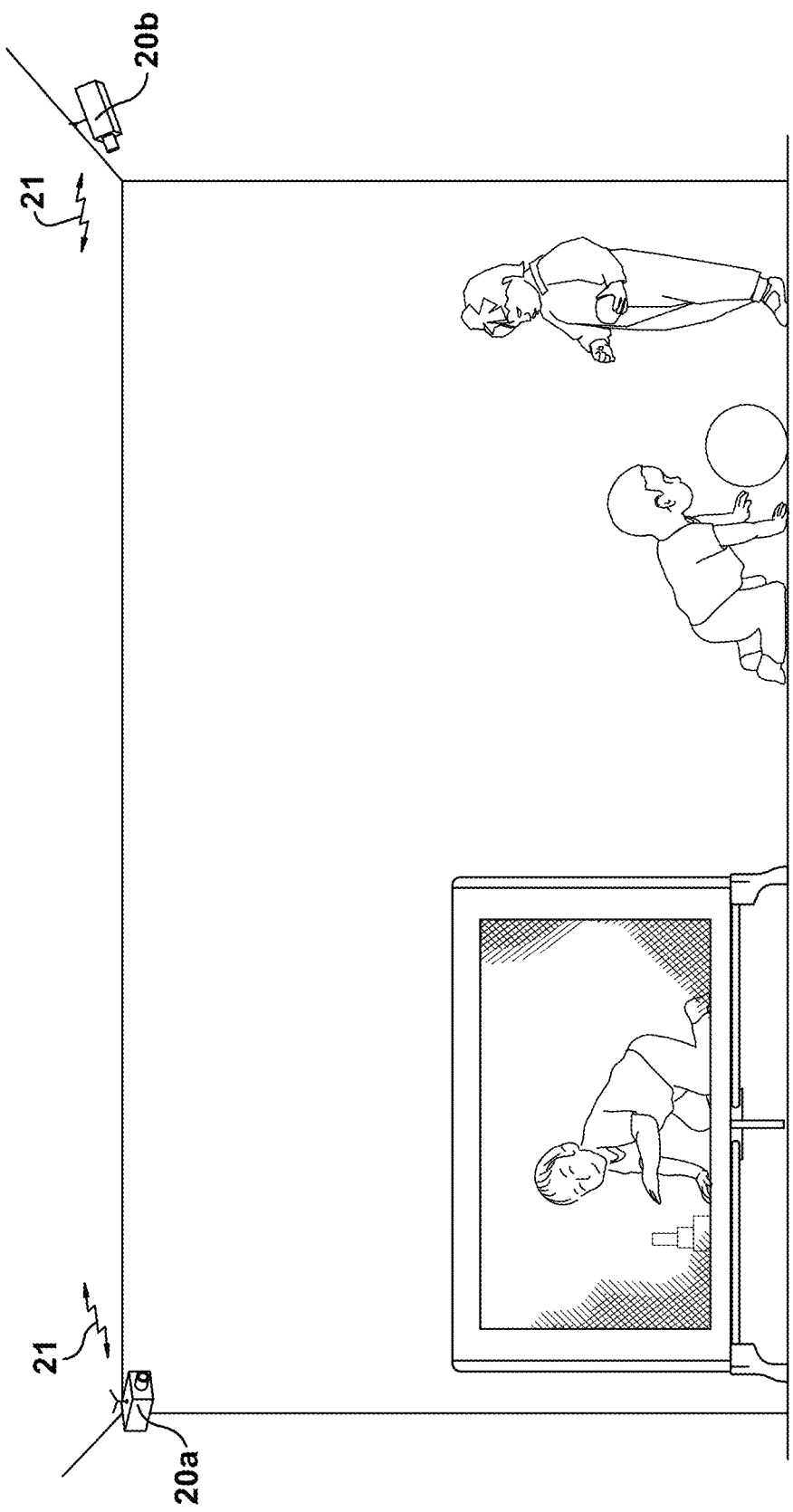
FIG. 9 is a schematic drawing of an example child indoor monitoring application.

Furthermore, the system can be used to monitor other safety situations other than swimming. For example, as shown in FIG. 8, the system may use a number of monitoring devices 20a-20d for monitoring children in a backyard, in a manner similar to that for monitoring a swimming pool as shown in FIG. 5. Although the monitored behavior might be somewhat different, the system is still looking for situations where the activity level of active children greatly drops, such as if a child becomes incapacitated. Additional monitoring could be for crying or screaming children, monitoring for bleeding or limping, or physical altercations between children. The children can also be monitored for any interaction with strangers, or for situations where the child is abducted or wanders away, or if a dangerous animal enters the yard. Similarly, FIG. 9 shows such a system adapted for monitoring children indoors as well for similar situations.

Such systems could be further adapted to monitor prisoners in prison, for example, or workers in an assembly line, for example. Also, automobiles could be monitored for accidents or dangerous driving situations, for example. Such systems could also be used to monitor the perimeter or interior of a home to detect burglaries or monitor pet activities as well.

Drowning Analysis

For any of the above embodiments or approaches, an example general analysis to determine a potential drowning incident is described below. The source of the data used for this analysis will depend on the type of system (i.e., the approach used), and the sensors that are involved (such as by using one or more example devices 10 and/or 20), and those steps that require data not provided for a given embodiment will be skipped in the analysis for that embodiment. The level of the analysis will depend on the processing capability of the system, and its memory capacity.

Generally, the input data to the system will be monitored and evaluated as follows (this is not an exclusive or exhaustive list):

Monitor and analyze information about the general activity of swimmer motion and splashing (e.g., using accelerometers, GPS, video data, audio data, depth or immersion data, etc.), and flag a major change in that activity, whether that activity is greatly increased or greatly decreased; Mark the flag urgent if this occurs for a longer period, and/or when the change in activity is very sudden; Directional audio analysis can be used to determine swimmer location and activity;

Monitor the orientation of the swimmer (e.g., using video or an accelerometer), and flag if the swimmer is supine, prone, or vertical for an unusual length of time; mark this flag urgent if this occurs for a longer period of time;

Monitor vocalization and shouting of the individual (e.g., by monitoring sound such as using sensors on the person or directional microphones), and flag when this greatly increases, or greatly decreases; In particular, mark the flag urgent if there is little or no vocalization for a relatively long period, especially after a period of strong vocalization; Monitor for gurgling or choking sounds;

Monitor the depth of the swimmer and/or amount of swimmer under water and/or length of time the swimmer is under water (e.g., by using a depth sensor or water/air sensor and/or video and/or audio data), in particular, monitor how often and how long the swimmer's mouth is underwater, and flag when the mouth spends an inordinate amount of time, or number of times, under water; Mark urgent if under water for long periods, especially if an open mouth can be detected; Monitor for bobbing activity as well;

Monitor the hands of the swimmer (e.g., using video or a water sensor on the wrists), and flag when the hands are held vertically for relatively long periods, or when the hands are not visible for a relatively long periods; or when the hands are held still under water for a relatively long period of time, or when the arms and hands appear to be passively floating in the water;

Monitor the pulse rate of the swimmer, and flag unusual increases and decreases; Flag urgent any completely missing or excessively low pulse rate;

Monitor the respiration of the swimmer (e.g., monitoring audio), and flag unusual respiration, such as gasping for air; flag urgent any lack of respiration; monitor for extensive coughing or choking;

Monitor the position of the swimmer (e.g., using video or GPS), and flag when the swimmer stays in the same relative position for a relatively long period of time, or when the swimmer appears to follow the flow of water;

Flag urgent if the swimmer completely disappears under water or otherwise disappears, or if it is determined that sensors have been removed from the swimmer;

Note particular extreme transitions, such as when heavy activity is suddenly followed by very light activity or no activity, which should be flagged as urgent if other drowning indicators are present;

Monitor situations where swimmers are interacting in a violent manner, or holding another swimmer's head under water; and Monitor whether swimmers are entering prohibited areas, such as where rip tides or rocks or other dangers may be present (this can be especially important for public swimming areas); Also, less skilled or younger swimmers can be monitored against their entering more dangerous or prohibited areas, such as deep water or using dangerous equipment such as diving boards (this can be useful for home systems where the skill of the swimmer is known).

Generally, simple sensor-based systems can perform such monitoring by considering the type of sensor and its location on the swimmer, as discussed in more detail in the discussion of the first approach.

For more processing intensive systems, such as under the second approach, much of this monitoring can be done by using visual recognition of video (or infrared or RADAR data) to identify and monitor various individuals and their respective body parts to determine activity and location of those individuals and their body parts. Additional sensors, such as audio sensors that can be mapped, panned, and zoomed to the locations of the individuals, can provide further information about breathing and other activities.

These systems will be programmed to monitor generally for indicators of problems (e.g., drastic changes in activity or noise), and then can "zoom in" on those problematic individuals for more processing intensive monitoring (e.g., monitor respiration, timing activities, etc.). If individuals are recognized by the system (such as using facial recognition or other identification methods) and the system has historical and/or individualized data (e.g., age and/or skill levels) for that individual, such information can be utilized for a more accurate analysis about the status of the individual, as can historical information about false alarms.

The systems will weigh these various flags and indicators by analyzing the data and their urgency, and the system will consider how many of the flags exist and their priority and durations, in order to calculate a likelihood that a drowning or other crisis is occurring. The weights and applicability of these flags may vary depending on settings of the system, and depending on a learning process based on historical information. The age and experience of the swimmers can also be taken into account in this analysis as discussed above.

For example, the system can be provided with the ability to change the weights provided to the various flags, and even ignore some flags, depending on currently monitored information, historical information, user settings, and depending on data obtained from the sensors. For example, the following information can be taken into account: Generally, the home-based systems should store historical information about individual swimmers whenever possible, and about past events, to improve the accuracy of the system.

As discussed above, the system can be set for the age and/or skill of the swimmer, or it may be able to approximately determine the age and/or skill of the swimmer based on input data, such as by monitoring the sensors and determining the swimming skill of the swimmer by comparing to stored parameters indicating swimmer skill. Swimmers who are able to swim well, such as by the system recognizing data that indicates particular swimming strokes, can be given higher thresholds than swimmers that are determined or set as being young and/or inexperienced. Thus, swimming capability rankings, age, past history, and other factors can be input into the device, or determined based on sensor and/or historical information (e.g., learning), and then this can be used to make the analysis more accurate.

Children who often swim underwater, for example, can have that activity de-emphasized as a cue to drowning, whereas children who rarely swim underwater or avoid dunking can have cues to that activity emphasized, for example, as more likely indicating a problem. Good swimmers who swim in a prone position can have that position de-emphasized, whereas those who cannot swim can have that position emphasized in the analysis.

Alarm events that are indicated as being false alarms can be used to reset parameters to avoid such false alarms in the future, in particular when there is a pattern to the false alarms. Thus, the system may be adapted to track such false alarms, and adapt its settings accordingly to avoid such false alarms in the future. Such settings may be global, or tied to individual swimmers where appropriate.

A video-based system can be programmed to recognize the signs of legitimate swim strokes, and a sensor based system may also be able to detect such strokes based on sensor data (e.g., by detecting rhythmic rotation of the arms for swim strokes, horizontal position, rapid horizontal movement, rhythmic head motions for breathing, leg movements associated with swimming, etc.). Thus, by programming the systems to recognize commonly used activities, false alarms can be greatly diminished. Such programming can be done by the manufacturer, or via a learning mode where the swimmer is asked to perform certain activities while the system is monitoring them in the learning mode.

Furthermore, the system can be programmed to monitor conditions that exist during false alarms or that nearly led to such a false alarm, and then adjust weighing factors and which parameters to ignore or de-emphasize based on those false alarm conditions, to better avoid false alarms in the future.

The system can also be programmed to present surveys to users to obtain desired information about particular swimmers. For example, in a system where swimmers are individually registered in the system (such as by video ID, for example), a questionnaire can be used to determine the swimmer's age, swimming skill, activity level, names, etc. to better evaluate when that swimmer would be in distress. By evaluating the various monitored factors according to weighing factors based on the questionnaires and based on historical information, each system can be customized and adapted for the particular swimmers that are being monitored. This is particularly useful for home use, where historical information is more likely to be obtainable. The system will adapt to the improved skills of the swimmers by maintaining the historical information on those individual swimmers and about past events. Furthermore, for any of these systems, the programming and algorithms can be adapted by updating the software periodically.

Any of the above systems could be adapted for remote monitoring of swimmers. Although young children should never be allowed to swim unsupervised, older children and adults with swimming skills may be considered at a lower risk of drowning. In such situations, a system where the base station or video monitoring unit is remote from the pool would allow for remote monitoring of such swimmers. In such a system, an alarm near the pool would be useful to notify other swimmers, but the remote person could also be notified. A sufficiently perfected system might even notify rescue authorities, such as EMS, by calling such centers. Such systems could even provide video of the event to rescue authorities for them to avoid responding to false alarms. The system might call a parent's cell phone to indicate a problem.

Finally, the above described systems can be utilized to provide additional safety features. For example, a determination that a drowning event is likely could be used to inflate a floatation device on the swimmer. Such a device might include a gas cartridge that can be used to inflate the device. The system might trigger a flare to warn of a problem. Thus, a signal from the base station, or from the swimming detector, could be used to trigger the inflation of the flotation device.

For other alternative uses, such as monitoring children indoors or in a yard, or for monitoring pets or prisoners, or for monitoring automobiles, or for home security, similar analysis functions could be utilized. Still important is the motion and activity of the monitored items or persons, and still important are transitions, such as a large reduction or increase in activity, a person or item entering a prohibited area, close proximities, or items or persons that leave the monitored areas, or unexpected persons entering such areas. Thus, the analysis techniques used for monitoring swimming can still be utilized with minor modifications for these additional purposes.

The processors discussed above may be any type of general purpose processor or computer, or may be a dedicated processor or controller. These devices can be programmed in any manner that is known in the industry, and may operate using any commercial operating system such as Windows or Linux, or other types of systems such as may be provided on commercially available computers, tablets, or other computing devices. Where desired, the processing functions could be implemented on dedicated devices or on home computing devices or centralized servers. Such systems might utilized cloud computing by offloading much of the processing in the "cloud" using rented or other commercially provided servers via Internet connections. The programming of the processor could be done using any commercially available programming language, such as Java, any variation of C, Visual Basic, or some other programming language. Commercially available databases might be used for storing the data and some of the processing rules. The memory devices might utilized any type of static or dynamic RAM, ROM, PROM, EPROM, hard drives, solid state drives, removable memory cards, or other data storage devices. Cloud based storage over an Internet connection might also be utilized.

Many other example embodiments of the invention can be provided through various combinations of the above described features. Although the invention has been described hereinabove using specific examples and embodiments, it will be understood by those skilled in the art that various alternatives may be used and equivalents may be substituted for elements and/or steps described herein, without necessarily deviating from the intended scope of the invention. Modifications may be necessary to adapt the invention to a particular situation or to particular needs without departing from the intended scope of the invention. It is intended that the invention not be limited to the particular implementations and embodiments described herein, but that the claims be given their broadest reasonable interpretation to cover all novel and non-obvious embodiments, literal or equivalent, disclosed or not, covered thereby.

What is claimed is:

1. A method for monitoring a swimmer swimming in a swimming area, said method comprising the steps of:
    generating swimmer status data using a sensor, wherein said swimmer status data provides information about a status of the swimmer swimming in the swimming area in real time;
    transmitting the swimmer status data to a computer system using a communication network for reception by the computer system;
    determining, using the computer system executing software instructions utilizing the swimming status data, that the swimmer is in distress, by performing the steps of:
        determining, using the computer system executing software instructions utilizing the swimming status data, when the swimmer is in an active stage of swimming,
        determining, using the computer system executing software instructions utilizing the swimming status data, when the swimmer is in a substantially inactive stage of swimming, and
        determining, using the computer system executing software instructions, that the swimmer is in distress at least in part by detecting a transition in status of the swimmer from the active stage of swimming to the substantially inactive stage of swimming;
    if it is determined that the swimmer is in distress, the computer system executing instructions to display, on a display, an image or a location of the swimmer that is in distress.

2. The method of claim 1, wherein said sensor is worn by the swimmer.

3. The method of claim 1, wherein said sensor includes a video camera located in or near the swimming area, and wherein if it is determined that the swimmer is in distress, an image of the swimmer is displayed by the computer system on a display.

4. The method of claim 3, wherein the image of the swimmer is displayed on the display and is obtained using the video camera or another video camera to zoom in on the swimmer when the swimmer is determined to be in distress.

5. The method of claim 1, wherein said sensor includes a video camera, said method further comprising the step of generating audio swimmer status data using an audio sensor, wherein said audio swimmer status data provides additional information about the status of the swimmer swimming in the swimming area, and wherein the step of determining when the swimmer is active stage and a substantially inactive stage both also include the computer system executing software instructions to utilize the audio swimmer status data to determine that the swimmer is in distress.

6. The method of claim 1, wherein said sensor includes a video camera, said method further comprising the step of generating additional swimmer status data using an additional sensor mounted on the swimmer, wherein said additional swimmer status data provides additional information about the status of the swimmer swimming in the swimming area, and wherein the step of determining when the swimmer is an active stage and when the swimmer is in a substantially inactive stage both also include the computer system executing software instructions to utilize the additional swimmer status data to determine that the swimmer is in distress.

7. The method of claim 1, wherein the swimmer status data is generated using a plurality of sensors including at least two video cameras located in different locations in or near the swimming area.

8. A method for monitoring a swimmer swimming in a swimming area, said method comprising the steps of:
    generating first swimmer status data using a first sensor, wherein said first swimmer status data provides information about a status of the swimmer swimming in the swimming area;
    transmitting the first swimmer status data to a computer system for reception by the computer system;
    generating second swimmer status data using a second sensor, wherein said second swimmer status data provides information about the status of the swimmer swimming in the swimming area;
    transmitting the second swimmer status data to the computer system for reception by the computer system;
        determining, using the computer system executing software instructions utilizing the first swimming status data and the second swimmer status data, when the swimmer is in an active stage of swimming,
        determining, using the computer system executing software instructions utilizing the first swimming status data and the second swimmer status data, when the swimmer is in a substantially inactive stage of swimming, and
    determining that the swimmer is in distress by detecting the transition from the active stage of swimming to the substantially inactive stage of swimming;

if it is determined that the swimmer is in distress, the computer system executing instructions to display, on a display, an image of the swimmer that is in distress;

if it is determined that the swimmer is in distress, the computer system executing instructions to provide an indication that the swimmer is in distress; and if it is determined that the swimmer is in distress, the computer system executing instructions to provide an indication of the location of the swimmer in the swimming area.

9. The method of claim 8, wherein said second sensor is an audio sensor.

10. The method of claim 8, wherein said second sensor is a sensor configured to be worn by the swimmer.

11. The method of claim 8, wherein the first sensor is a video camera.

12. The method of claim 8, wherein the first and second sensors are video cameras.

13. The method of claim 8, wherein the first sensor is a video camera, and wherein the image of the swimmer displayed by the display is obtained using the video camera to zoom in on the swimmer when the swimmer is determined to be in distress.

14. A method for monitoring a swimmer swimming in a swimming area, said method comprising the steps of:

generating first swimmer status data using a video camera located in or near the swimming area, wherein said first swimmer status data provides information about a status of the swimmer swimming in the swimming area;

transmitting the first swimmer status data to a computer system for reception by the computer system;

generating second swimmer status data using a second sensor provided on the swimmer, wherein said second swimmer status data provides information about the status of the swimmer swimming in the swimming area;

wirelessly transmitting the second swimmer status data to a computer system for reception by the computer system;

determining, using the computer system executing software instructions utilizing the first swimming status data and the second swimmer status data, that the swimmer is in distress by performing the steps of:

determining, using the computer system executing software instructions utilizing the first swimming status data and the second swimmer status data, when the swimmer is in an active stage of swimming, determining, using the computer system executing software instructions to utilize the first swimming status data and the second swimmer status data, when the swimmer is in a substantially inactive stage of swimming, and determining, using the computer system executing software instructions to utilize the first swimming status data, that the swimmer is in distress by detecting a transition in status of the swimmer from the active stage of swimming to the substantially inactive stage of swimming;

and if it is determined that the swimmer is in distress, the computer system executing software instructions to display an alarm indication, on the display, indicating that the swimmer is in distress; and if it is determined that the swimmer is in distress, the computer system executing software instructions to provide an indication of the location of the swimmer in the swimming area by displaying, on a display, an image of the swimmer that is in distress obtained from the video camera and to indicate a location of the swimmer in the swimming area.

15. The method of claim 14, wherein the image of the swimmer displayed by the display is obtained using the video camera to zoom in on the swimmer when the swimmer is determined to be in distress.

16. A method for monitoring a swimmer swimming in a swimming area, said method comprising the steps of:

generating swimmer status data using a video camera, wherein said swimmer status data provides information about a status of the swimmer swimming in the swimming area in real time;

transmitting the swimmer status data to a computer system using a communication network for reception by the computer system;

determining, using the computer system executing software instructions utilizing the swimming status data, that the swimmer is in distress, by performing the steps of:

determining, using the computer system executing software instructions utilizing the swimming status data, when the swimmer is in an active stage of swimming, determining, using the computer system executing software instructions utilizing the swimming status data, when the swimmer is in a substantially inactive stage of swimming, and determining, using the computer system executing software instructions, that the swimmer is in distress at least in part by detecting a transition in status of the swimmer from the active stage of swimming to the substantially inactive stage of swimming;

if it is determined that the swimmer is in distress, the computer system executing instructions to display, on a display, an image or a location of the swimmer that is in distress.

17. The method of claim 16, wherein said video camera is located in or near the swimming area, and wherein if it is determined that the swimmer is in distress, an image of the swimmer is displayed by the computer system on a display.

18. The method of claim 17, wherein the image of the swimmer is displayed on the display and is obtained using the video camera or another video camera to zoom in on the swimmer when the swimmer is determined to be in distress.

19. The method of claim 16, further comprising an audio sensor, said method further comprising the step of generating audio swimmer status data using said audio sensor, wherein said audio swimmer status data provides additional information about the status of the swimmer swimming in the swimming area, and wherein the step of determining when the swimmer is in the active stage and the step of determining when the simmer is in a substantially inactive stage both also include the computer system executing software instructions to utilize the audio swimmer status data.

20. The method of claim 16, said method further comprising the step of generating additional swimmer status data using an additional sensor mounted on the swimmer, wherein said additional swimmer status data provides additional information about the status of the swimmer swimming in the swimming area, and wherein the step of determining when the swimmer is the active stage and the step of determining when the swimmer is in a substantially inactive stage both also include the computer system executing software instructions to utilize the additional swimmer status data to determine that the swimmer is in distress.

\* \* \* \* \*